United States Patent
Chung

(10) Patent No.: US 12,039,570 B2
(45) Date of Patent: *Jul. 16, 2024

(54) USER-CUSTOMIZABLE, USER-PERSONALIZABLE AND USER COMPENSABLE KEYBOARD PROVIDING SYSTEM AND METHOD

(71) Applicant: Neopad Inc., Seoul (KR)

(72) Inventor: Hee Sung Chung, Seoul (KR)

(73) Assignee: NEOPAD INC., Seoul (KR)

( * ) Notice: Subject to any disclaimer, the term of this patent is extended or adjusted under 35 U.S.C. 154(b) by 555 days.

This patent is subject to a terminal disclaimer.

(21) Appl. No.: 17/136,363

(22) Filed: Dec. 29, 2020

(65) Prior Publication Data

US 2021/0118012 A1 Apr. 22, 2021

Related U.S. Application Data

(63) Continuation-in-part of application No. 15/676,095, filed on Aug. 14, 2017, now abandoned, which is a
(Continued)

(30) Foreign Application Priority Data

Nov. 5, 2010 (KR) .................. 10-2010-0109487

(51) Int. Cl.
*G06Q 30/0251* (2023.01)
*G06F 3/0484* (2022.01)
(Continued)

(52) U.S. Cl.
CPC ....... *G06Q 30/0269* (2013.01); *G06F 3/0484* (2013.01); *G06F 3/04886* (2013.01);
(Continued)

(58) Field of Classification Search
None
See application file for complete search history.

(56) References Cited

U.S. PATENT DOCUMENTS

| 5,852,812 A | 12/1998 | Reeder |
| 6,381,325 B1 | 4/2002 | Hanson |

(Continued)

FOREIGN PATENT DOCUMENTS

| CN | 101135968 A | 3/2008 |
| CN | 101572746 A * | 11/2009 |

(Continued)

OTHER PUBLICATIONS

Huan et al. A virtual keyboard system based on Multi-Level Feature Matching. 2008 Conference on Human System Interactions (pp. 176-181). Publication Date: May 1, 2008. (Year: 2008).*

(Continued)

*Primary Examiner* — Patricia H Munson
*Assistant Examiner* — Nancy N Prasad
(74) *Attorney, Agent, or Firm* — WHDA, LLP

(57) ABSTRACT

The present invention provides a method and system for providing a user-customized virtual keyboard to a user's smartphone, in which characters in various languages can be input and a background skin of the keyboard can be selected by the user. The present invention also provides a method and system for providing a user-personalizable virtual keyboard capable of providing the user's personal text data inputted by using the keyboard selected by the user to a third party including the keyboard provider, and the keyboard provider can process the input text data provided by the user. The present invention further provides a method and system for providing a user compensable keyboard capable of providing related news and various compensation information including advertisement contents searched by the key- (Continued)

board provider, to the user's smartphone based on the user's input text data provided by the user.

19 Claims, 17 Drawing Sheets

Related U.S. Application Data continuation-in-part of application No. 13/387,115, filed as application No. PCT/KR2011/007355 on Oct. 5, 2011, now abandoned.

(51) Int. Cl.
*G06F 3/04886* (2022.01)
*G06Q 30/0241* (2023.01)
*G06Q 30/0273* (2023.01)
*G06T 11/60* (2006.01)

(52) U.S. Cl.
CPC ..... *G06Q 30/0256* (2013.01); *G06Q 30/0273* (2013.01); *G06Q 30/0277* (2013.01); *G06T 11/60* (2013.01); *G06F 2203/04804* (2013.01); *G06T 2200/24* (2013.01)

(56) References Cited

U.S. PATENT DOCUMENTS

| | | |
|---|---|---|
| 6,535,726 B1 | 3/2003 | Johnson |
| 6,721,716 B1 | 4/2004 | Gross |
| 6,886,135 B2 | 4/2005 | Fernandez et al. |
| 7,039,389 B2 | 5/2006 | Johnson, Jr. |
| 7,177,837 B2 | 2/2007 | Pegaz-Paquet et al. |
| 8,059,100 B2 | 11/2011 | Kim et al. |
| 8,175,617 B2 | 5/2012 | Rodriguez |
| 2001/0056362 A1 | 12/2001 | Hanagan et al. |
| 2002/0107795 A1 | 8/2002 | Minear et al. |
| 2002/0166127 A1 | 11/2002 | Hamano et al. |
| 2003/0074328 A1 | 4/2003 | Schiff et al. |
| 2003/0078886 A1 | 4/2003 | Minear et al. |
| 2003/0083991 A1 | 5/2003 | Kikinis |
| 2003/0176182 A1 | 9/2003 | Cerami et al. |
| 2003/0197687 A1* | 10/2003 | Shetter ............... G06F 3/04886 345/173 |
| 2004/0116119 A1 | 6/2004 | Lewis et al. |
| 2004/0135902 A1 | 7/2004 | Steensma |
| 2005/0192878 A1 | 9/2005 | Minear et al. |
| 2006/0004630 A1* | 1/2006 | Criddle ............. G06Q 30/0248 705/14.47 |
| 2006/0143119 A1 | 6/2006 | Krueger et al. |
| 2006/0253350 A1 | 11/2006 | Falkenhain et al. |
| 2007/0067305 A1* | 3/2007 | Ives ..................... G06Q 30/02 |
| 2007/0101365 A1* | 5/2007 | Clark .................... G06Q 30/02 725/38 |
| 2007/0109276 A1 | 5/2007 | Kim et al. |
| 2008/0165140 A1* | 7/2008 | Christie ............. G06F 3/04883 345/173 |
| 2009/0132371 A1 | 5/2009 | Strietzel et al. |
| 2009/0265245 A1 | 10/2009 | Wright |
| 2011/0021234 A1* | 1/2011 | Tibbitts ................. H04W 8/22 455/517 |
| 2011/0173558 A1 | 7/2011 | Yeh et al. |
| 2011/0300912 A1 | 12/2011 | Kim et al. |

FOREIGN PATENT DOCUMENTS

| | | |
|---|---|---|
| CN | 101572746 A | 11/2009 |
| JP | 2008-003982 A | 1/2008 |
| JP | 2008-217516 A | 9/2008 |
| JP | 2010-186350 A | 8/2010 |
| JP | 2010-533925 A | 10/2010 |
| KR | 10-2001-0005475 A | 1/2001 |
| KR | 10-0323316 B1 | 2/2002 |
| KR | 10-2003-0073957 A | 9/2003 |
| KR | 10-2007-0052583 A | 5/2007 |
| KR | 10-2008-0035165 A | 4/2008 |
| KR | 10-0831874 B1 | 5/2008 |
| KR | 10-1044320 B1 | 6/2011 |

OTHER PUBLICATIONS

Office Action dated Feb. 17, 2017, issued in counterpart Japanese Application No. 2013-537596. (4 pages).
Office Action dated Dec. 15, 2014, issued in counterpart Chinese Application No. 2014121001313880. (11 pages).
International Search Report dated May 9, 2012, issued in counterpart application No. PCT/KR2011/007355, with English translation. (4 pages).

* cited by examiner

| LANGUAGE | INPUT METHOD | INPUT UNIT FORM | PRODUCTION DATE | PRODUCER | SIZE | ... |
|---|---|---|---|---|---|---|
| Eng | Qwerty | Qwerty | 2010.10.10 | XXX | 480X200 | ... |
| Kor | Neopad | 5X5pad | 2010.10.9 | 000 | 480X200 | ... |
| ... | ... | ... | ... | ... | ... | ... |

FIG. 11a

| CONTENTS NAME | PRODUCER | PRODUCTION DATE | CONTENTS MEDIUM | SIZE | COPYRIGHT HOLDER | RATING | DOMAIN | ... |
|---|---|---|---|---|---|---|---|---|
| ENGLISH TEXTBOOK | △△△ | 2010. △.△ | VIDEO | 5Mb | 0 | A | EDUCATION | ... |
| XXX | 000 | 2010.0.0 | VIDEO | 3Mb | 0 | B | ENTERTAINMENT | ... |
| ... | ... | ... | ... | ... | ... | ... | ... | ... |

FIG. 11b

| ADVERTISEMENT CONTENTS NAME | COMPENSATION METHOD | READ ADVERTISEMENT ITEM | READ AUTOMATIC COUNTS | READING ITEM | ADVERTISEMENT PROVIDER |
|---|---|---|---|---|---|
| XXX | 10 WON PER SECOND | 5cut | 120,000 | 48 HOUR | XXX |
| ... | ... | ... | ... | ... | ... |

FIG. 11c

| USER NAME | READ ADVERTISEMENT | READ TIME | COMPENSATION AMOUNT | COUPON | DESIRED COMPENSATION METHOD |
|---|---|---|---|---|---|
| KIM XX | 0000 | 40 HOURS | 240,000 WON | 0 | CASH |
| ... | ... | ... | ... | ... | ... |

FIG. 11d

USER-CUSTOMIZABLE, USER-PERSONALIZABLE AND USER COMPENSABLE KEYBOARD PROVIDING SYSTEM AND METHOD

CROSS-REFERENCE TO RELATED APPLICATION

The present invention is a CIP application of U.S. patent application Ser. No. 15/676,095 filed on Aug. 14, 2017, which is a CIP of U.S. patent application Ser. No. 13/387,115 filed on Jan. 26, 2012. This application claims priorities from Korea Patent Application No. 10-2010-0109487 filed on Nov. 5, 2010 and PCT Patent Application No. PCT/KR11/07355 filed on Oct. 5, 2011, all of which are incorporated herein by reference in its entirety.

TECHNICAL FIELD

The present invention relates to a method and system for providing a user-customizable, user-personalizable, and user compensable keyboard of the smartphone.

BACKGROUND

Recently, among mobile information communication terminals such as smartphones and pad-type PCs and on-board-type information communication terminals such as navigation systems, the number of terminals supporting a touch user interface (TUI) has rapidly increased. The TUI displays various types of keypads (or keyboards) such as a Qwerty keyboard and a 12 keypad on a display screen. When a user touches a virtual keypad, the TUI recognizes the touched keypad as an input signal. Such a virtual keyboard provides diversity of tools and enables a user to freely select a device. Furthermore, terminals having the TUI mounted therein provide an intuitional user interface (UI). Therefore, although terminals having the TUI mounted therein are relatively expensive, they have high product competitiveness.

In the conventional terminals supporting the TUI, a virtual keyboard is very frequently used to utilize a search window of an information search engine, a social network service (SNS), an e-mail service, or a multimedia message service (MMS). However, although a virtual keypad occupies a considerably large area of a display screen in the conventional terminals supporting the TUI, the background image of the keypad is provided as a single-color button. That is, the virtual keypad occupying a considerably large display space is provided in software. However, the display space has not been utilized for business purposes.

A typical mobile information communication terminal has a limited space which may be utilized for a business service. However, it is important for the recent business services to secure a space where an interactive service with a user may be performed. This is the latest technology field where UI technology aimed for realizing convenient writing and easy learning and UX technology aimed for satisfying writing pleasure and latent needs are merged.

Meanwhile, techniques for providing a background image include a technique related to 'skin'. Korean Patent Laid-open Application No. 2003-0073957 discloses an apparatus and method for controlling skin modification as the technique related to 'skin'. The apparatus for controlling skin modification is provided in a mobile communication terminal including a display device capable of displaying characters or symbols corresponding to the characters and a select keypad for selection, and includes an internal memory having an internal memory address area and an external memory address area, an external memory configured to store various skin data, and a controller configured to read skin data from the external memory and set the read skin data when a skin is selected in case where the external memory is mounted.

However, the conventional technique and the techniques related thereto do not provide a business mode based on UX and have nothing to do with a virtual keypad provided by a TUI. This is because it is only a short time since information communication equipment such as smart phones emerged, and the development of techniques related to UX has not come to maturity.

In particular, there has been no technology for mutual benefit between smartphone users and smartphone keyboard providers by utilizing the smartphone keyboard area up until now.

DISCLOSURE

Technical Problem

An embodiment of the present invention is directed to a method and system for providing a background advertisement of a virtual keyboard, which utilizes a background space of a virtual keyboard displayed by a TUI as an advertisement business space to provide user-customized or user-interactive advertisement contents, and offers a proper reward in compensation for reading an advertisement, thereby providing an economic benefit to a user who provides an unused space and creating a new model of the mobile advertising business for an advertiser or advertisement service provider.

The present invention is directed to a method and system for providing a user-customizable, user-personalizable, and user compensable keyboard that can be used as a useful tool through interaction between the user and the keyboard provider using the background skin or foreground skin of the smartphone keyboard area, which has been neglected so far.

More specifically, one embodiment of the present invention is directed to a method and system for providing a user-customized virtual keyboard to a user's smartphone, in which characters in various languages can be input, and a background skin of keyboard can be selected by the user.

In addition, the present invention is directed to a method and system for providing a user-personalizable virtual keyboard capable of providing the user's personal text data inputted by using the keyboard selected by the user to a third party including the keyboard provider, and the keyboard provider can process the input text data provided by the user. As a result, the present invention is directed to providing a user-personalizable keyboard for providing useful advertisement content provided by a third party to the user's smartphone according to the user input character data.

Further, another embodiment of the present invention is directed to a method and system for providing a user compensable keyboard capable of providing related news and various compensation information including advertisement type contents of a third party searched by the keyboard provider, to the user's smartphone based on the user's input text data provided by the user.

Technical Solution

According to an embodiment of the present invention, there is provided a system for providing a user-customizable, user-personalizable and user compensable keyboard of smartphone.

The system includes the following:

A smartphone wirelessly connected to a keyboard provider server or an advertisement provider server for mutual data communication, a smartphone equipped with a touch display, CPU, memory devices, and a file system or database that stores and manages user's photos or images, a user personal photos file system to store and manage user personal photos or images for a background skin of the keyboard on the smartphone, an advertisement content skins database to store and manage advertisement content skins, wherein the system is configured to perform the following functions:

Selecting a keyboard from multilingual keyboards provided by the keyboard provider, selecting a background skin from the user personal photo file system or the advertisement content skins DB, generating a transparent skin keyboard corresponding to the selected keyboard on the smartphone, combining the transparent skin keyboard and the selected background skin on the smartphone, generating a virtual keyboard with the background skin on the smartphone, storing the generated virtual keyboard on the user smartphone, inputting character data using the generated virtual keyboard by the user, storing the character data inputted by the user to the user's smartphone memory, providing the input character data to the keyboard provider server or the advertisement provider server for processing information of the provided user input character data or the user's personal information on the keyboard provider server or on the advertisement provider server, searching advertisement content skins by using the processed information from the advertisement content skins database, generating the searched advertisement content skins by the keyboard provider or by the advertisement provider server, providing the generated advertisement content skins to the user smartphone, wherein the keyboard includes at least one among Galician, Gujarati, Greek, Dutch, Nepali, Norwegian, Danish, German, Lao, Latvian, Latin, Russian, Romanian, Luxembourgish, Lithuanian, Marathi, Maori, Macedonian, Malagasy, Malayalam, Malay, Maltese, Mongolian, Mongolian, Myanmar (Burmese), Basque, Vietnamese, Belarusian, Bengali, Bosnian, Bulgarian, Samoan, Serbian, Cebuano, Sesotho, Somali, Shona, Sundanese, Swahili, Swedish, Scottish Gaelic, Spanish, Slovak, Slovenian, Sindhi, Sinhalese, Arabic, Armenian, Icelandic, Haitian Creole, Irish, Azerbaijani, Afrikaans, Albanian, Amharic, Estonian, Esperanto, English, Oriya, Yoruba, Urdu, Uzbek, Ukrainian, Welsh, Uighur, Igbo, Yiddish, Italian, Indonesian, Japanese, Javanese, Georgian, Zulu, Chinese, Chewa, Czech, Kazakh, Catalan, Kannada, Corsican, Xhosa, Kurdish, Croatian, Khmer, Kinyarwanda, Kyrgyz, Tagalog, Tamil, Tajik, Tatar, Thai, Turkish, Telugu, Turkmen, Pashto, Punjabi, Persian, Portuguese, Polish, French, Frisian, Finnish, Hawaiian, Hausa, Korean, Hungarian, Hebrew and Hindi, wherein the advertisement contents include a multimedia file containing at least one of a picture, a photo, an animation, a 2D video, a 3D video, or text. The information processed on the keyboard provider server includes searching for advertisement contents, news, or map information related to character inputted by the user or information permitted by the user.

The advertisement content skins include at least one of a commercial solicitation designed to sell some commodity, service, or similar, public notice, and a recommendation of a particular product, service or person, and the advertisement content skins are displayed as a background or foreground skin of the keyboard.

According to another embodiment of the present invention, there is provided a system for providing a user-customizable, user-personalizable and user compensable keyboard of smartphone.

The system includes the following:

A smartphone wirelessly connected to a keyboard provider server or an advertisement provider server for mutual data communication, a smartphone equipped with a touch display, CPU, memory devices, and a file system or database that stores and manages user's photos or images, a user personal photo file system to store and manage user personal photos or images for a background skin of the keyboard on the smartphone, an advertisement content skins database and server to store and manage advertisement content skins, wherein the system is configured to perform the following functions:

Selecting a keyboard from multilingual keyboards provided by the keyboard provider, selecting a background skin from the user personal photo file system or the advertisement content skins DB, generating a transparent skin keyboard corresponding to the selected keyboard on the smartphone, combining the generated transparent skin keyboard and the selected background skin on the smartphone, generating a virtual keyboard with the background skin on the smartphone, storing the generated virtual keyboard of the user smartphone on the user smartphone, inputting character data using the generated virtual keyboard by the user, storing the character data inputted by the user or user's personal information to the user's smartphone memory, providing the input character data to the keyboard provider server for processing information of the provided user input character data or the user's personal information on the keyboard provider server, searching an advertisement content by using the processed information from the advertisement content database, generating the searched advertisement content skins by keyboard provider or by the advertisement provider server, displaying the generated advertisement content skins on the keyboard region of the user smartphone, compensating for providing the user's personal character data or user's personal information entered by the user-personalizable keyboard to the keyboard provider or to the advertisement provider server, wherein the keyboard includes at least one among Galician, Gujarati, Greek, Dutch, Nepali, Norwegian, Danish, German, Lao, Latvian, Latin, Russian, Romanian, Luxembourgish, Lithuanian, Marathi, Maori, Macedonian, Malagasy, Malayalam, Malay, Maltese, Mongolian, Mongolian, Myanmar (Burmese), Basque, Vietnamese, Belarusian, Bengali, Bosnian, Bulgarian, Samoan, Serbian, Cebuano, Sesotho, Somali, Shona, Sundanese, Swahili, Swedish, Scottish Gaelic, Spanish, Slovak, Slovenian, Sindhi, Sinhalese, Arabic, Armenian, Icelandic, Haitian Creole, Irish, Azerbaijani, Afrikaans, Albanian, Amharic, Estonian, Esperanto, English, Oriya, Yoruba, Urdu, Uzbek, Ukrainian, Welsh, Uighur, Igbo, Yiddish, Italian, Indonesian, Japanese, Javanese, Georgian, Zulu, Chinese, Chewa, Czech, Kazakh, Catalan, Kannada, Corsican, Xhosa, Kurdish, Croatian, Khmer, Kinyarwanda, Kyrgyz, Tagalog, Tamil, Tajik, Tatar, Thai, Turkish, Telugu, Turkmen, Pashto, Punjabi, Persian, Portuguese, Polish, French, Frisian, Finnish, Hawaiian, Hausa, Korean, Hungarian, Hebrew and Hindi.

The advertisement contents include a multimedia file containing at least one of a picture, a photograph, an animation, a 2D video, a 3D video, or text. The compensation for providing user's input character data to the keyboard provider is the advertisement content skins searched by the user's input character or user's personal information, and the advertisement content skins include at least one of a commercial solicitation designed to sell some commodity, service, or similar, public notice, and a recommendation of a particular product, service, or person.

According to an embodiment of the present invention, there is provided a method for providing a user-customizable, user-personalizable and user compensable keyboard of smartphone.

The method includes:

A smartphone wirelessly connected to a keyboard provider server or an advertisement provider server for mutual data communication, a smartphone equipped with a touch display, CPU, memory devices, and a file system or database that stores and manages user's photos or images, a user personal photos file system to store and manage user personal photos or images for a background skin of the keyboard on the smartphone, an advertisement content skins database to store and manage advertisement content skins, Selecting a keyboard from multilingual keyboards provided by the keyboard provider, selecting a background skin from the user personal photo file system or the advertisement content skins DB, generating a transparent skin keyboard corresponding to the selected keyboard on the smartphone, combining the transparent skin keyboard and the selected background skin on the smartphone, generating a virtual keyboard with the background skin on the smartphone, storing the generated virtual keyboard on the user smartphone, inputting character data using the generated virtual keyboard by the user, storing the character data inputted by the user to the user's smartphone memory, providing the input character data to the keyboard provider server or to the advertisement provider server for processing information of the provided user input character data or the user's personal information on the keyboard provider server or on the advertisement provider server, searching advertisement content skins by using the processed information from the advertisement content skins database, generating the searched advertisement content skins by keyboard provider or by the advertisement provider server, providing the generated advertisement content skins to the user smartphone, wherein the keyboard includes at least one among Galician, Gujarati, Greek, Dutch, Nepali, Norwegian, Danish, German, Lao, Latvian, Latin, Russian, Romanian, Luxembourgish, Lithuanian, Marathi, Maori, Macedonian, Malagasy, Malayalam, Malay, Maltese, Mongolian, Mongolian, Myanmar (Burmese), Basque, Vietnamese, Belarusian, Bengali, Bosnian, Bulgarian, Samoan, Serbian, Cebuano, Sesotho, Somali, Shona, Sundanese, Swahili, Swedish, Scottish Gaelic, Spanish, Slovak, Slovenian, Sindhi, Sinhalese, Arabic, Armenian, Icelandic, Haitian Creole, Irish, Azerbaijani, Afrikaans, Albanian, Amharic, Estonian, Esperanto, English, Oriya, Yoruba, Urdu, Uzbek, Ukrainian, Welsh, Uighur, Igbo, Yiddish, Italian, Indonesian, Japanese, Javanese, Georgian, Zulu, Chinese, Chewa, Czech, Kazakh, Catalan, Kannada, Corsican, Xhosa, Kurdish, Croatian, Khmer, Kinyarwanda, Kyrgyz, Tagalog, Tamil, Tajik, Tatar, Thai, Turkish, Telugu, Turkmen, Pashto, Punjabi, Persian, Portuguese, Polish, French, Frisian, Finnish, Hawaiian, Hausa, Korean, Hungarian, Hebrew and Hindi.

The advertisement contents include a multimedia file containing at least one of a picture, a photo, an animation, a 2D video, a 3D video, or text. The information processed on the keyboard provider server includes searching for advertisement contents, news, or map information related to character inputted by the user or information permitted by the user. The advertisement content skins include at least one of a commercial solicitation designed to sell some commodity, service, or similar, public notice, and a recommendation of a particular product, service or person, and the advertisement content skins are displayed as a background or foreground skin of the keyboard.

According to another embodiment of the present invention, there is provided a method for providing a user-customizable, user-personalizable and user compensable keyboard of smartphone.

The method includes:

A smartphone wirelessly connected to a keyboard provider server or an advertisement provider server for mutual data communication, a smartphone equipped with a touch display, CPU, memory devices, and a file system or database that stores and manages user's photos or images, a user personal photo file system to store and manage user personal photos or images for a background skin of the keyboard on the smartphone, an advertisement content skins database and server to store and manage advertisement content skins, Selecting a keyboard from multilingual keyboards provided by the keyboard provider, selecting a background skin from the user personal photo file system or the advertisement content skins DB, generating a transparent skin keyboard corresponding to the selected keyboard on the smartphone, combining the generated transparent skin keyboard and the selected background skin on the smartphone, generating a virtual keyboard with the background skin on the smartphone, storing the generated virtual keyboard of the user smartphone on the user smartphone, inputting character data using the generated virtual keyboard by the user, storing the character data inputted by the user or user's personal information to the user's smartphone memory, providing the input character data to the keyboard provider server or to the advertisement provider server for processing information of the provided user input character data or the user's personal information on the keyboard provider server or on the advertisement provider server, searching a advertisement content by using the processed information from the advertisement content database, generating the searched advertisement content skins by keyboard provider or by the advertisement provider server, displaying the generated advertisement content skins on the keyboard region of the user smartphone, compensating for providing the user's personal character data or user's personal information entered by the user-personalizable keyboard to the keyboard provider or to the advertisement provider server, wherein the keyboard includes at least one among Galician, Gujarati, Greek, Dutch, Nepali, Norwegian, Danish, German, Lao, Latvian, Latin, Russian, Romanian, Luxembourgish, Lithuanian, Marathi, Maori, Macedonian, Malagasy, Malayalam, Malay, Maltese, Mongolian, Mongolian, Myanmar (Burmese), Basque, Vietnamese, Belarusian, Bengali, Bosnian, Bulgarian, Samoan, Serbian, Cebuano, Sesotho, Somali, Shona, Sundanese, Swahili, Swedish, Scottish Gaelic, Spanish, Slovak, Slovenian, Sindhi, Sinhalese, Arabic, Armenian, Icelandic, Haitian Creole, Irish, Azerbaijani, Afrikaans, Albanian, Amharic, Estonian, Esperanto, English, Oriya, Yoruba, Urdu, Uzbek, Ukrainian, Welsh, Uighur, Igbo, Yiddish, Italian, Indonesian, Japanese, Javanese, Georgian, Zulu, Chinese, Chewa, Czech, Kazakh, Catalan, Kannada, Corsican, Xhosa, Kurdish, Croatian, Khmer, Kinyarwanda, Kyrgyz, Tagalog, Tamil, Tajik, Tatar, Thai, Turkish, Telugu, Turkmen, Pashto, Punjabi, Persian, Portuguese, Polish, French, Frisian, Finnish, Hawaiian, Hausa, Korean, Hungarian, Hebrew and Hindi.

The advertisement contents include a multimedia file containing at least one of a picture, a photograph, an animation, a 2D video, a 3D video, or text. The compensation for providing user's input character data to the keyboard provider is the advertisement content skins searched by the user's input character or user's personal information, and the advertisement content skins include at least one of a commercial solicitation designed to sell come commodity, service, or similar, public notice, and a recommendation of a particular product, service, or person.

Advantageous Effects of the Present Invention

The embodiments of the present invention, the method and system for providing user-customizable, user-personalizable and user compensable keyboard provides the following advantageous effects.
1) The present invention provides a user-customizable, user-personalizable, and user compensable keyboard that can be used as a useful tool through interaction between the user and the keyboard provider using the background skin or foreground skin of the smartphone keyboard area, which has been neglected so far.
2) The present invention provides a user-personalizable virtual keyboard of the smartphone possible to provide the user's personal text data inputted by using the keyboard selected by the user to a third party including the keyboard provider.
3) According to the present invention, the keyboard provider can process the input text data provided by the user and provide a user-personalizable keyboard for providing useful advertisement content provided by a third party to the user's smartphone.
4) According to the present invention, the keyboard provider can provide various keyboards to users around the world who speak various languages and can provide user-customized useful information or advertisement contents to the keyboard area of user's smartphone based on big language data provided by the user keyboard.
5) According to the present invention, a new business model can be created through the collaboration between a smartphone user and a keyboard provider. That is, a user can obtain useful advertisements or information by providing personal text information produced on his/her keyboard to a keyboard provider. Meanwhile, the keyboard provider can provide a user-customized advertisement system that can learn, classify, and predict the user's personal information using artificial intelligence technology by acquiring big text information from all keyboard users.

BRIEF DESCRIPTION OF THE DRAWINGS

FIGS. 11A to 11D show memory tables including record attributes of DB systems.

BEST MODE FOR THE INVENTION

Figure 1:
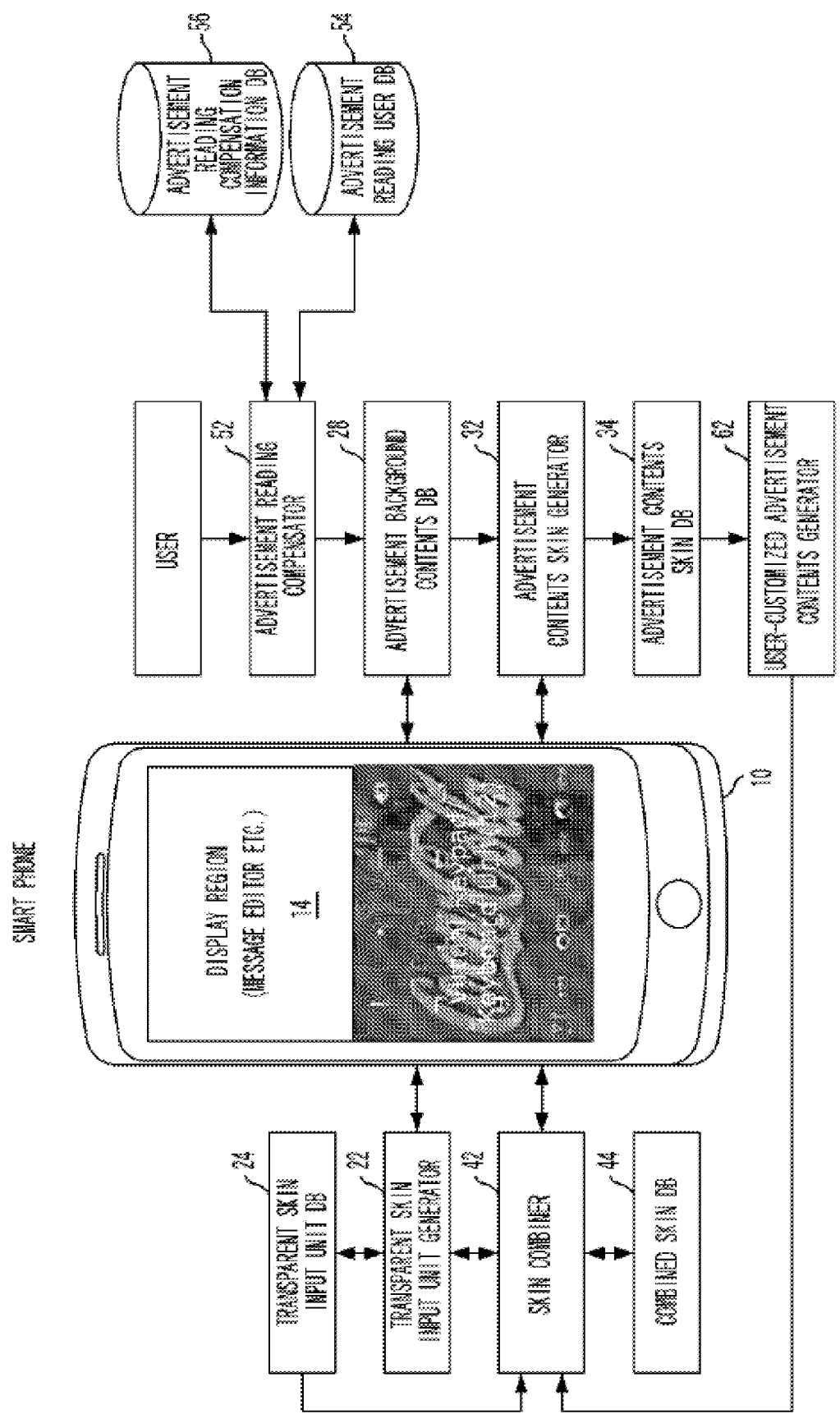
FIG. 1 is a block diagram of a system for providing a background or foreground advertisement content skin of a virtual keyboard region of smartphone according to an embodiment of the present invention.

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and willfully convey the scope of the present invention to those skilled in the art. Throughout the disclosure, like reference numerals refer to like parts throughout the various figures and embodiments of the present invention.

FIG. 1 is a block diagram showing an example of a system that provides a user-customizable, user-personalizable and user compensable virtual keyboard for the smartphone as a character input tool for a smartphone having a new UX concept according to the present invention.

Figure 2:
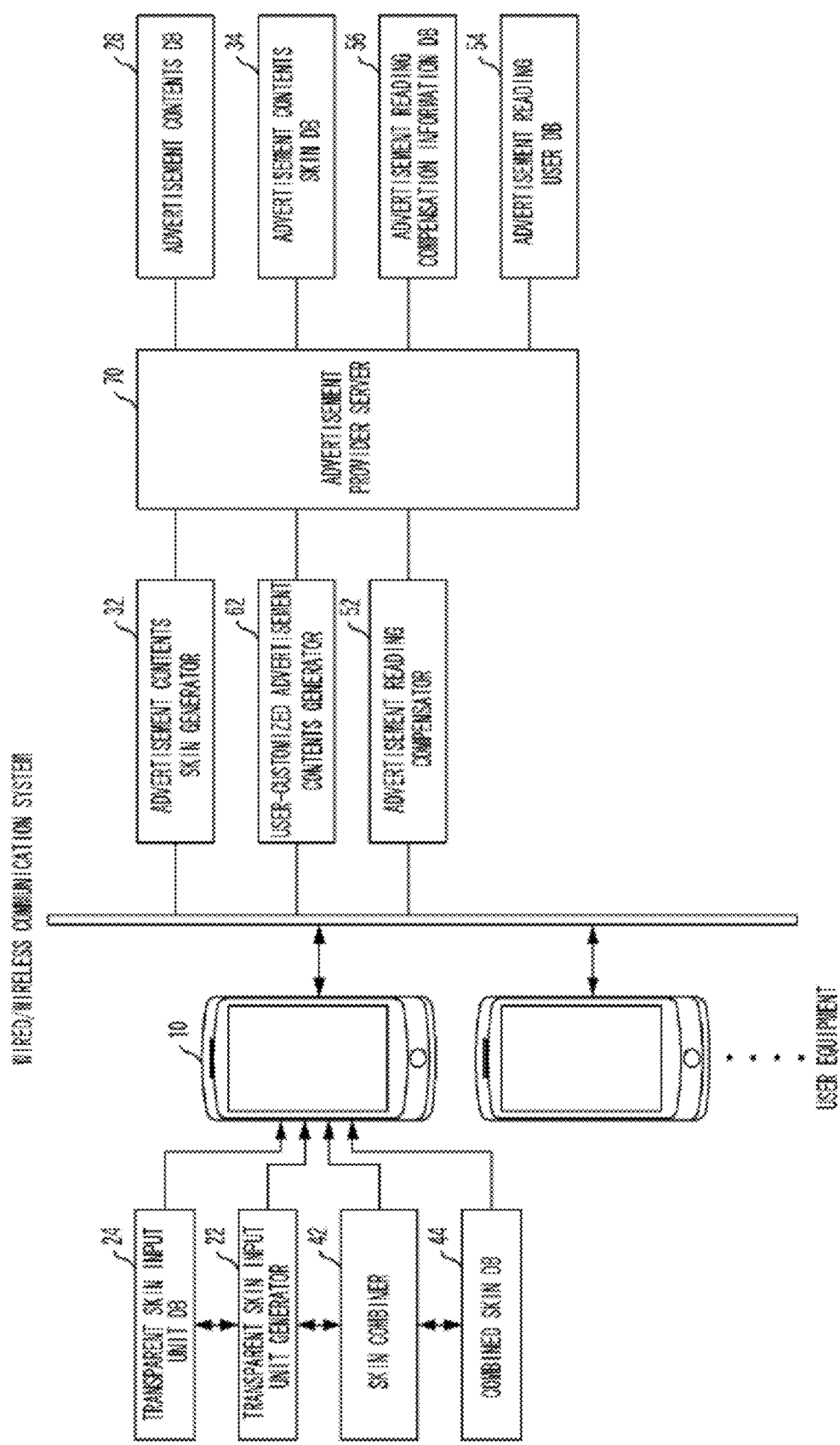
FIG. 2 is a block diagram of a system for providing a background or foreground advertisement of a virtual keyboard region of smartphone according to another embodiment of the present invention.

FIG. 2 illustrates an example of a smartphone and a user-customizable and user-personalizable virtual keyboard connected keyboard/advertisement provider server and smartphones through a wired/wireless communication system.

In the following descriptions, "virtual keyboard" refers to a keypad or keyboard which is displayed in software by a TUI. For example, the keypad or keyboard includes a Qwerty keyboard, a 12-number or character keypad, a number input keypad for telephone dialing and so on. In this embodiment of the present invention, the virtual keyboard is provided as a transparent skin. Herein after, this will be referred to as 'transparent skin keyboard.

Furthermore, keyboard advertisement contents are standardized to form a advertisement contents which is to be displayed on an information communication terminal such as the smartphone 10, and the advertisement contents skin is combined with the transparent skin keyboard and then displayed on the smartphone 10. Hereinafter, a skin obtained by standardizing advertisement contents according to the information communication terminal is referred to as advertisement contents skin, and a keyboard skin obtained by combining a transparent skin keyboard and a background skin is referred to as 'combined keyboard skin'.

Referring to FIG. 1 and FIG. 2, the system for providing user-customizable, user-personalizable, and user compensable virtual keyboard according to the embodiment of the present invention includes a transparent skin keyboard generator 22, the keyboard background/foreground skin generation processor 32, and the transparent skin keyboard and the background/foreground skin combination processor 42 configured to combine a transparent skin keyboard and a background/foreground skin. The system may further selectively include a user compensation processor 52 including the user input text data provision consent function and user-personalized advertisement content skins generation processor 62 as a result of search processing based on the user provided character data.

The meaning of the user-customizable, user-personalizable, and user compensable virtual keyboard providing system for the smartphones of the present invention is based on customization and personalization generally defined in the technical field of the present invention as follows.

Customization is done by the user. A system may enable users to customize or make changes to the experience to meet their specific needs by configuring layout, content, or system functionality. Customization may involve moving items around an interface to reflect the users' priorities, selecting topics of interest, or altering colors or other factors related to the visual design of an interface.

Personalization is done by the system being used. Developers set up the system to identify users and deliver to them the content, experience, or functionality that matches their role. Personalization can be done down at the individual level or at group or audience level.

The user-customizable keyboard providing system of the present invention according to the definition of customization and personalization as described above means that the keyboard and keyboard background skin enable the user to select the keyboard of the language suitable for their use, as well as the visual design of the keyboard of the selected language.

In addition, the user-personalizable keyboard providing system of the present invention can provide a function of providing character data inputted by the user to the keyboard provider server using the user-customizable keyboard selected by the user and can provide advertisement contents searched according to the user's input character data provided to the keyboard provider server to the user's smartphone.

The keyboard selected by the user is varied according to the user's language, and the text data inputted for each user is different, and the text data provided to the keyboard provider server for each user is different. Accordingly, since the advertisement content provided by the keyboard provider server as a search result based on the text data provided by the user can be a personal type of the user, the user-personalizable keyboard of the present invention can be provided.

In addition, the user compensable keyboard of the present invention can provide the character data or user's information inputted by using a keyboard provided from a keyboard provider server to the keyboard provider server, and the keyboard provider server can provide the user-customized advertisement contents and information related to the character data provided by the user to the user smartphone.

That is, the user compensable keyboard of the present invention is a keyboard that has the function of the keyboard provider server providing user-customized advertisement contents or information to the user as compensation for the user's input character data provided by the user-customized keyboard to the keyboard provider server.

The types of keyboard background skin in the present invention include advertisement contents and user personally owned contents. Advertisement content skins include the following meanings:

1) a commercial solicitation designed to sell some commodity, service, or similar.
2) a public notice.
3) a recommendation of a particular product, service, or person.

It refers to content that has three meanings as shown above. In addition, "user personal contents" refers to photo or image contents owned by a user.

Therefore, the "keyboard background skin" of the present invention includes 1) keyboard background content with the meaning of commercial solicitation; 2) keyboard background content with the meaning of public notice; and 3) keyboard background content with the meaning of recommendation.

Meanwhile, the keyboard background skin including content owned by the user means a photo or image that the user stores in the album of his or her smartphone.

In addition, in the present invention, the "foreground skin" can be defined and provided at the same time in conjunction with the "background skin" technology.

The difference between the "background skin" and the "foreground skin" is that the "background skin" is a user personal content or advertisement content combined under the transparent skin keyboard, and the "foreground skin" is combined and displayed on the combined keyboard.

The two skins are only provided in different ways depending on the type of content provided to the user's smartphone. For example, if the skin combined with the keyboard is a relatively long-term user-customized personal content, the background skin is suitable, and if the advertisement contents are temporarily presented, the foreground skin is suitable.

The reason for distinguishing skin in this way is to provide a more convenient user interface to the user. However, the purpose, function, method, and result of providing a user-customizable, user-personalizable and user compensable keyboard of the present invention are substantially the same.

That is, the object and effect of the present invention to implement and provide a user-customizable, user-personalizable and user compensable keyboard using a keyboard and keyboard area of a smartphone are not different from the two methods of providing skin.

An exemplary embodiment of the two skins of the present invention will be described later.

Here, components such as 'processor' refer to components that play specific roles and are implemented in graphic processing software on an external PC or information communication terminal. Meanwhile, 'processor' may refer to a hardware component such as field-programmable gate array (FPGA) or application-specific integrated circuit (ASIC). As such, 'processor' is not limited to software or hardware. For example, 'processor' may be constructed in a storage medium and may be configured to drive one or more processors. For example, 'processor' may include certain processes, functions, subroutines, segments of a program code, firmware, microcode, a database, and variables.

The transparent skin keyboard generator 22 serves to generate character keys for inputting a specific language (for example, Korean, English, Alphabet, universal character set, symbol, and number) designated by a user and a two-dimensional (2D) figure having frame data of the character keys. When the language and standard of a virtual keyboard are decided by a user, the transparent skin keyboard generator 22 generates the virtual keyboard into a transparent skin keyboard. The generated transparent skin keyboard is stored in and managed by a transparent skin input unit DB 24. The transparent skin keyboard DB 24 includes data attributes, such as language, input method, keyboard form, production date, producer, and size, for each keyboard. The transparent skin keyboard DB 24 and '~DB' which will be described below may be implemented by using a typical DB system and may be implemented in the form of gallery photo files provided by the smartphone 10.

The types of world characters include the following seventy (70) languages, and a keyboard for inputting each language may be provided.

Galician, Gujarati, Greek, Dutch, Nepali, Norwegian, Danish, German, Lao, Latvian, Latin, Russian, Romanian, Luxembourgish, Lithuanian, Marathi, Maori, Macedonian, Malagasy, Malayalam, Malay, Maltese, Mongolian, Mongolian, Myanmar (Burmese), Basque, Vietnamese, Belarusian, Bengali, Bosnian, Bulgarian, Samoan, Serbian, Cebuano, Sesotho, Somali, Shona, Sundanese, Swahili, Swedish, Scottish Gaelic, Spanish, Slovak, Slovenian, Sindhi, Sinhalese, Arabic, Armenian, Icelandic, Haitian Creole, Irish, Azerbaijani, Afrikaans, Albanian, Amharic, Estonian, Esperanto, English, Oriya, Yoruba, Urdu, Uzbek, Ukrainian, Welsh, Uighur, Igbo, Yiddish, Italian, Indonesian, Japanese, Javanese, Georgian, Zulu, Chinese, Chewa, Czech, Kazakh, Catalan, Kannada, Corsican, Xhosa, Kurdish, Croatian, Khmer, Kinyarwanda, Kyrgyz, Tagalog, Tamil, Tajik, Tatar, Thai, Turkish, Telugu, Turkmen, Pashto, Punjabi, Persian, Portuguese, Polish, French, Frisian, Finnish, Hawaiian, Hausa, Korean, Hungarian, Hebrew and Hindi Referring to FIG. 1, two embodiments of the present invention will be described, in which advertisement content skin is provided to the keyboard area of the user smartphone.

First, it is an embodiment of a system that provides advertisement content as a background skin of a keyboard.

The background skin generation processor 32 serves to generate advertisement contents in a background skin form according to the size and shape of a virtual keyboard. The background skin generation processor 32 may be implemented in graphic processing software which is installed in an information communication terminal and configured to process advertisement contents provided from outside into a background skin form. The advertisement contents may be streamed or downloaded in real time. Furthermore, referring to FIG. 2, the background skin generation processor 32 may be provided in an external advertisement provider server 70 and configured to generate and provide an advertisement contents skin suitable for a user's smartphone 10. FIG. 1 illustrates that the background skin generation processor 32 is provided in the smartphone 10, and FIG. 2 illustrates that the background skin generation processor 32 is provided in the advertisement provider server 70.

An advertisement contents DB 28 is used to store advertisement contents. Desirably, the advertisement contents DB is a DB system provided in an advertiser or advertisement service provider side (hereinafter, commonly referred to as 'advertisement provider'). Advertisement contents include multimedia files containing pictures, photographs, animations, videos, or 3D videos. The advertisement contents DB 28 stores various types of advertisement contents according to various attributes for each advertiser, each advertisement type, each contents form, and each advertisement rating.

A user may access a wireless Internet/Intranet connection and download the background skins (advertisement contents or user personal contents), using the smartphone 10. Furthermore, the user may temporarily store and manage a list of background skin which are provided by the background skin provider server 70 in real time. A wireless connection detector is used to detect whether free wireless access is available to the information communication terminal and notify its availability to the user. Here, the information communication terminal accesses the background skins and displays the background skins based on the result of the wireless connection detector, and the information communication terminal connects automatically with the free wireless access when the free wireless access is available, thereby reducing cost of the user and a provider of the background skins. Among the background skins or foreground skins stored in the background skin DB 28, background skins which are selected and downloaded by the user or background skins which are authenticated by the user and then designated by an advertisement provider are generated as a background skin suitable for a terminal by the background skin generation processor 32. The generated background skin is stored in and managed by a background skin DB 34. The background skin DB 34 has data attributes including advertisement name, advertisement producer, production date, contents media, size, copyright, contents form, and contents rating for each background skins.

The skin combination processor 42 is configured to combine a 2D-figure transparent skin keyboard 23 generated by the transparent skin keyboard generation processor 22 and a background skin generated by the background skin generation processor 32 and form a combined skin 43. The transparent skin keyboard 23 has only frame data of character keys. For example, the skin combination processor 42 is implemented in graphic software and provided in the smartphone 10. The combined skin 43 formed by the skin combination processor 42 is stored in and managed by a combined skin DB 44. Referring to FIG. 1, the smartphone 10 includes a lower region for displaying the combined skin 43 and an upper region 14 for displaying an editor such as a message editor.

The user's input character/information providing compensation processor 52 rewards a user who provides the character data inputted by using selected keyboard to a keyboard provider server or to a user who views an advertisement contents provided by a keyboard provider or a advertisement provider.

A user's input character data/information providing compensation processor 52 serves to offer a reward in compensation for the user who provides the character data inputted by using a keyboard selected by the user and permits to use user's information to keyboard provider server.

The user's input character data/information providing compensation processor 52 may be provided in the keyboard or advertisement provider server 70. The user's input character/information providing compensation processor 52 provides the advertisement contents including an economic benefit such as coupon, cash, prize, discount, reputation, or a useful information based on a user's input character data or advertisement reading time and an advertisement reading number of a user. The advertisement provider server 70 includes a user DB 54 and a compensation information DB 56, in order to offer also a compensation.

The user-customized advertisement contents generation processor 62 serves to search and extract advertisement contents searched by a user's input character data from the advertisement contents DB 34. The user-customized advertisement contents generation processor 62 is searched by using a user's input character data and may be installed in the keyboard provider server or the advertisement provider server 70.

Figure 3:
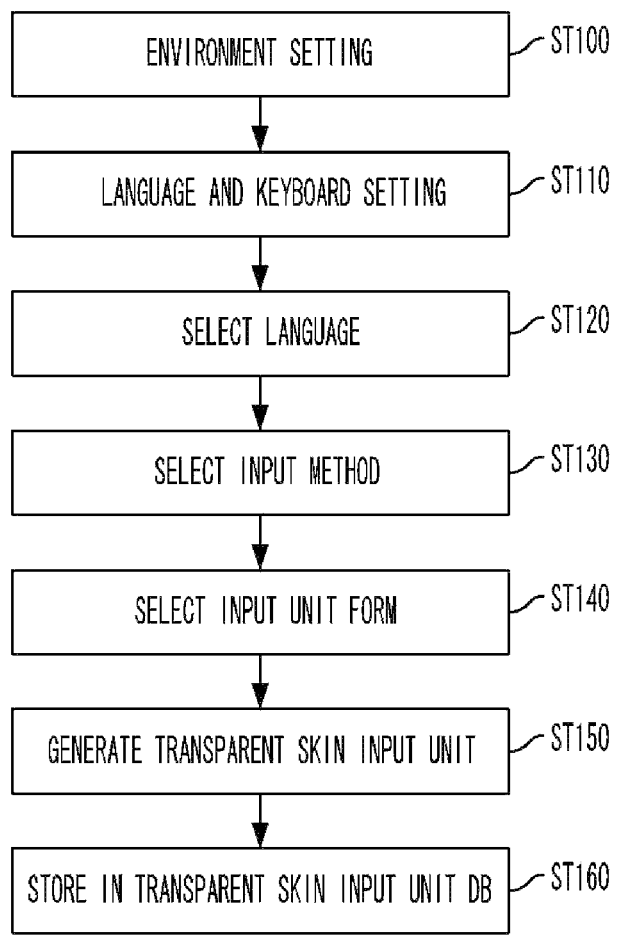
FIG. 3 is a flow chart showing a process of generating a transparent skin keyboard of a virtual keyboard.

FIG. 3 is a flow chart showing a process of generating a transparent skin keyboard of a virtual keyboard. FIG. 3 shows a process of selecting a virtual keyboard in the smartphone 10. In the smartphone 10, environment settings for character input are collectively managed by a menu referred to as 'Settings'. As a user executes 'Settings', the process is started at step ST100. Then, language and keyboard setting of a virtual keyboard (by a TUI) is performed in the environment setting mode, at step ST110. Here, the user selects a language of the virtual keyboard at step ST120 and selects an input method at step ST130.

The input method may include various input methods such as a full keyboard, a 12-key pad, and a handwriting input system. The full keyboard may include a Qwerty keyboard, and the 12-key pad may include a tele phone pad. When the input method is selected, the user selects the shape of the virtual keyboard at step ST140. The virtual keyboard may include a horizontal virtual keypad, a vertical virtual keypad, a full Qwerty keyboard, or a 12-key number pad.

When the shape of the virtual keyboard is selected, a transparent skin keyboard is generated based on the selected shape at step ST150. Furthermore, the generated keyboard DB 24.

Figure 4A:
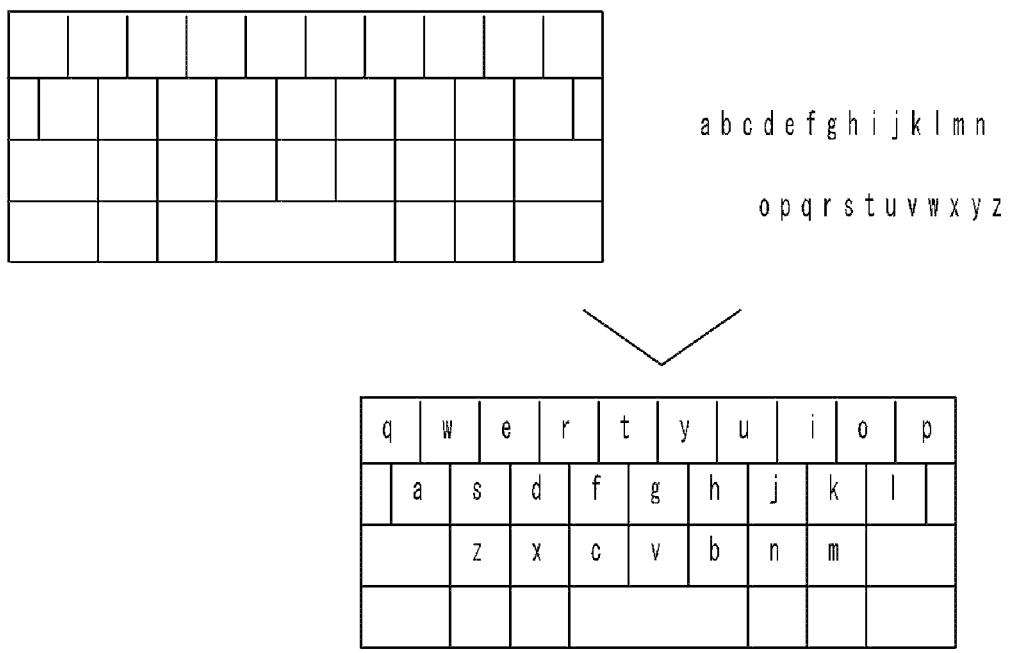
FIGS. 4A and 4B illustrate a process of generating a transparent skin keyboard.
Figure 4B:
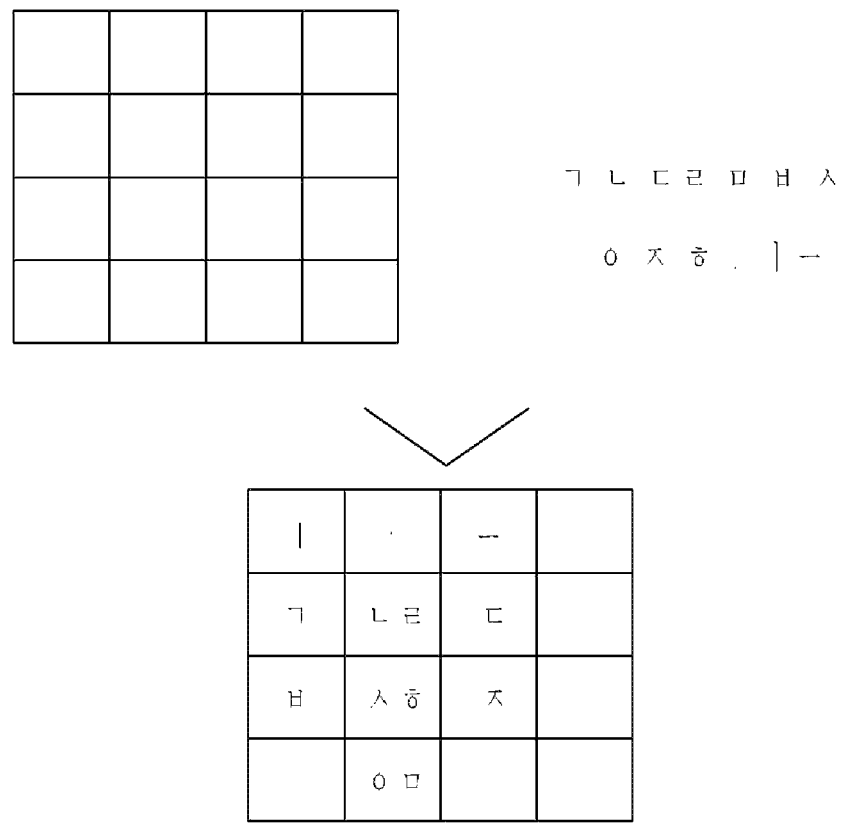

FIGS. 4A and 4B illustrate a process of generating a transparent skin keyboard. The transparent skin keyboard generator 22 generates a Qwerty keyboard-type transparent skin keyboard 23 as illustrated in FIG. 4A or a 4×4 keypad-type transparent skin keyboard 23 as illustrated in FIG. 4B. The transparent skin keyboard 23 is constructed in a 2D arrangement. That is, the transparent skin keyboard 23 includes graphic data where boundaries for dividing character keys and function keys are clearly represented and the other regions are transparent.

More specifically, the size of the virtual keyboard is set to 'horizontal pixel number*vertical pixel number', and the virtual keyboard is generated as 2D graphic data. The generated 2D graphic data are processed by the unit of key arrangement, and lines are drawn according to the shape of the virtual keyboard. Subsequently, graphic processing is performed to insert characters or symbols of function keys into the respective key arrangements, and the other regions of the virtual keyboard excluding the boundary lines, the characters, and the symbols of the respective keys are clarified. Then, the transparent skin keyboard 23 of the virtual keyboard is generated. In other words, the transparent skin keyboard 23 is generated by computer graphic processing which may obtain an effect of printing key boundary lines and characters on a transparent glass panel.

Figure 5:
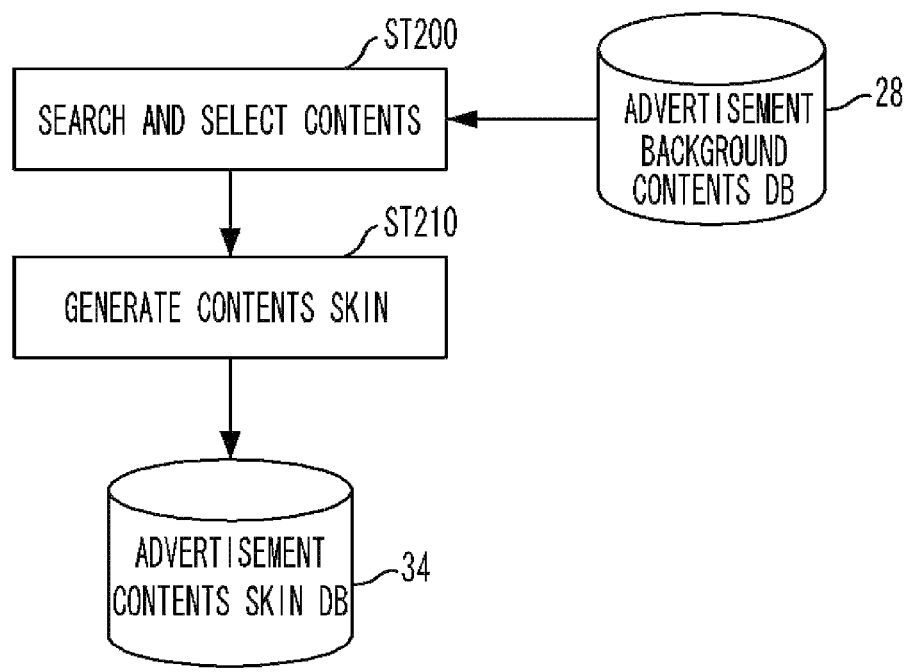
FIG. 5 shows a process of generating an advertisement contents skin from advertisement contents.

FIG. 5 shows a process of generating a background skin from background skins including advertisement contents and user personal contents. Referring to FIG. 5, the process is started by searching background skin including advertisement contents and user personal contents at step ST200. At this time, the advertisement contents DB 28 is referred to. The searching of the background skin including advertisement contents and user personal contents may be performed by using attributes of the respective skins or contents, such as contents name, producer, and provider. After the searching of the advertisement contents or user personal contents, the searched contents are displayed on the display screen of the user's smartphone. When the user selects advertisement contents or user personal contents, the background skin generation processor 32 generates an advertisement contents skin or user personal contents at step ST210. The generated background skin is stored in the background skin DB 34 (FIG. 2).

The advertisement contents skin generation processor 32 adjusts the selected contents according to the physical characteristics of the user's information communication terminal, that is, the size and resolution of the virtual keypad, and generates the advertisement contents skin or user personal contents skin. This process is carried out by a graphic software tool.

Figure 6:
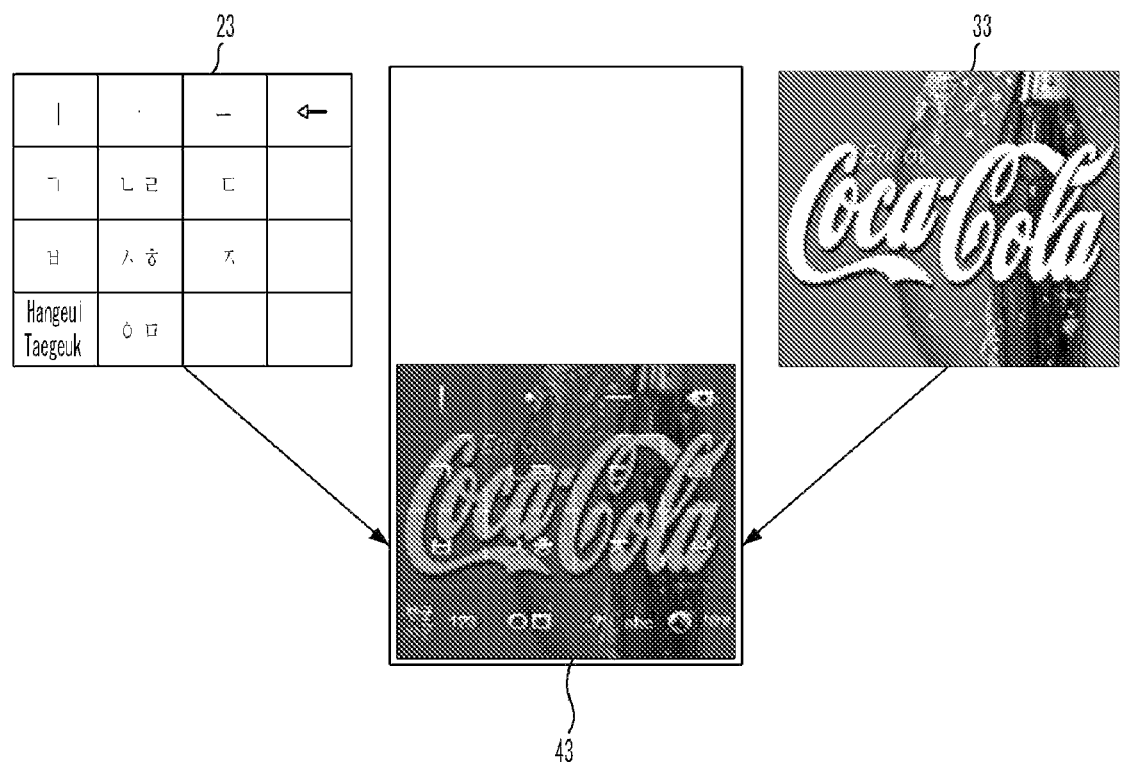
FIG. 6 shows a process of combining a transparent skin keyboard and an advertisement contents skin.

FIG. 6 shows a process of combining a transparent skin keyboard and an advertisement contents skin or user personal contents skin. Referring to FIG. 6, it can be seen that the transparent skin keyboard 23 generated through the process of FIG. 3 and the advertisement contents skin or user personal contents skin generated through the process of FIG. 5 are combined to form the combined skin 43. The generation process of the combined skin 43 is performed as follows. First, the advertisement contents skin or user personal contents skin is loaded into a virtual keyboard region of the smartphone 10, and the transparent skin keyboard 23 is then loaded and combined with the advertisement contents skin or personal contents skin. When the combined skin 43 is formed in such a manner, the virtual keyboard according to the embodiment of the present invention is completely formed. The virtual keyboard is displayed on the lower region 12 of the smartphone 10 as illustrated in FIG. 1.

Figure 7:
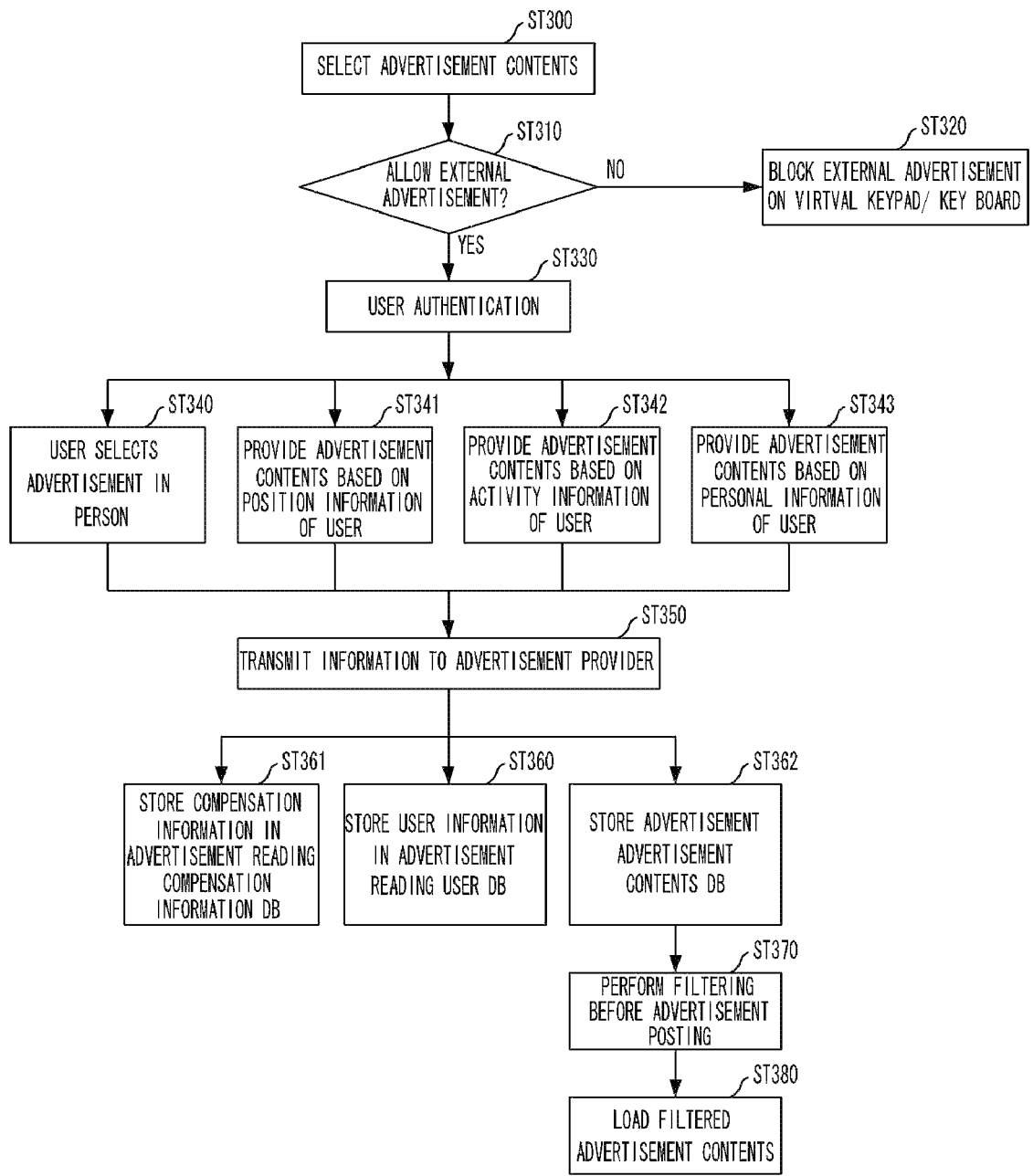
FIG. 7 is a flow chart showing a process of selecting advertisement contents.

FIG. 7 is a flow chart showing a process of advertisement contents. Referring to FIG. 7, an advertisement contents selection process is performed at step ST300, and whether the user of the smartphone 10 allows an external advertisement skin or not is confirmed at step ST310. When the user does not allow an external advertisement, an external advertisement is blocked at step ST320. In this case, the user may load a desired background or foreground image into the display region of the virtual keyboard. The background or foreground image may include contents containing picture, photograph, video, or animation, which are taken or created by the user.

When the user allows an external advertisement, the external advertisement is provided after a user authentication step ST330. The external advertisement is provided from the advertisement provider server 70. The external advertisement may be provided in various manners. Here, the user may receive the external advertisement by selecting any one of methods which will be described below or according to a combination of two or more methods.

First, the user may select or allow an external advertisement at step ST340. For example, metadata such as new books, records, movies, nearby restaurant, store, clothes, and map are provided to the user. Then, the user selects or allows metadata of an advertisement or information which the user wants to read or to permit.

Second, the external advertisement contents may be provided based on the position information of the user, at step S341. For example, a GPS module provided in the smartphone 10 transmits the current position of the user to the keyboard or advertisement provider server 70. The keyboard or advertisement provider server 70 collects the position information of the user and provides the advertisement contents related to the position information. For example, the advertisement provider server 70 may provide information on famous restaurants positioned within a 1-km radius of the user's current position, in an advertisement contents form.

Third, advertisement contents may be provided based on activity information of the user, at step S342. For example, the user stores information on shopping records or work in the smartphone 10, and the information is transmitted to the keyboard or advertisement provider server 70 by user permission or authentication. The keyboard or advertisement provider server 70 provides related background skins by referring to the provided user input text data about activity information of the user. For example, when the user frequently inputs clothes shopping, the keyboard or advertisement provider server 70 provides the user with a clothes shopping advertisement in a background skins or foreground skins form.

Fourth, advertisement contents may be provided based on personal information of the user, at step ST343. For example, personal information on the occupation, age, sex, family background, and income of the user is transmitted to the keyboard or advertisement provider server 70 by user authentication or permission. The keyboard or advertisement provider server 70 provides advertisement contents or information related to the personal information of the user by referring to the personal information. For example, when the user does not own a car or has recently sold his/her car, the keyboard or advertisement provider server 70 provides the user with a car advertisement in a background or foreground skins form.

The four steps ST340 to ST343 may be performed in parallel or only one of the steps ST340 to ST343 may be performed by a user's selection or permission. Furthermore, when the user selects any one type, the selected type and information are transmitted to an advertisement provider at step ST350. Such an advertisement contents providing method may provide an environment in which the user selects or permits an advertisement in an interactive manner with advertisement providers.

The keyboard or advertisement provider server 70 stores the information of the user reading the advertisement in the user DB 54 at step ST360, and stores compensation information on the advertisement reading in the compensation information DB 56 at step ST361. Furthermore, the advertisement provider server 70 stores the background or foreground skins selected by the user in the background skins DB 28 at step S362. In some cases, the keyboard or advertisement provider server 70 may generate the foreground skins and operate an advertisement content skins DB 34, before the step ST362. In this case, the advertisement content skins are stored in the advertisement contents skin DB 34 at the step ST362.

Then, before the advertisement contents skin is provided to the user, filtering is performed at step S370. During the filtering, the contents are searched and processed by using the attribute information of the advertisement contents DB 28. For example, since a search word such as 'porno' corresponds to a value of an advertisement area as attribute information, advertisement posting may be rejected in a state where adult verification is failed. Then, the filtered background skins or advertisement contents skin is loaded into the information communication terminal of the user, at step ST380.

Figure 8:
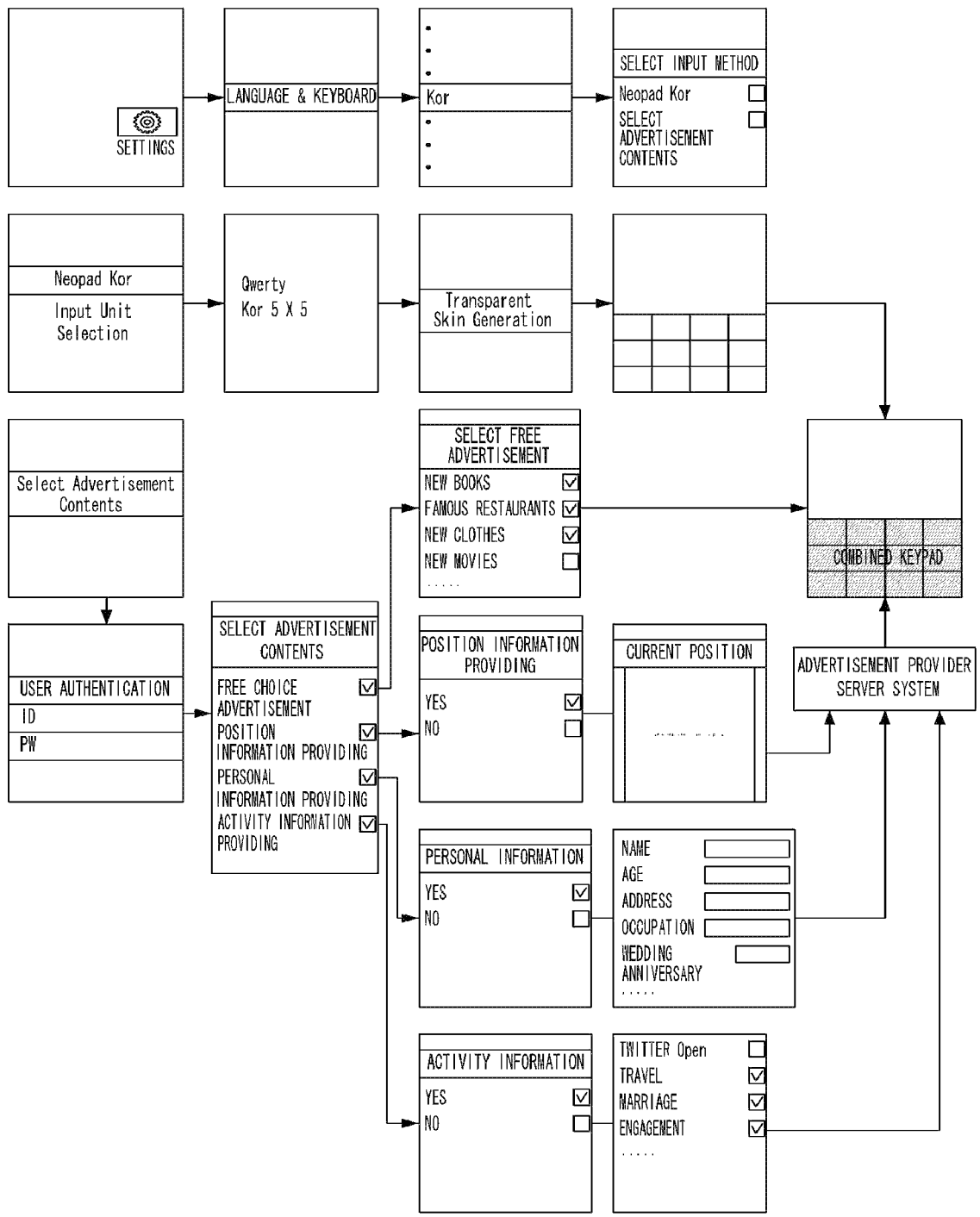
FIG. 8 illustrates an example in which the method for providing advertisement contents of a virtual keyboard according to the embodiment of the present invention is performed in an Android-based smartphone.

FIG. 8 illustrates an example in which the method for providing the advertisement content of background skins of a virtual keyboard according to the embodiment of the present invention is performed in an Android-based smartphone. FIG. 8 obviously illustrates a process in which a background skin of a virtual keyboard is provided according to the embodiment of the present invention. Referring to FIG. 8, a user touches a 'Settings' widget provided by the smartphone 10 to activate a language and keyboard selection window. Then, the user selects 'Kor' representing Korean from the selection window.

When the user selects 'Neopad Kor' from an input method selection window, an keyboard selection process is started as illustrated in a second line of FIG. 8. During the keyboard selection process, when the user selects a Qwerty and 5×5 Korean keypad, the transparent skin keyboard generator 22 loads a 2D transparent skin keyboard 23 onto the screen.

Meanwhile, when the user selects 'Select/Permit Advertisement Contents' from the input method selection window, an advertisement content selection process is started as illustrated in a third line of FIG. 8. First, a user authentication or permission process is performed as illustrated in a fourth line of FIG. 8. The user inputs his/her ID and password so as to passthrough an authentication procedure. Then, the user selects an advertisement item from the background skins selection window. Here, although not illustrated, the user may reject posting of loan advertisements or obscene advertisements such as porno. In this case, the user may not check metadata of the corresponding advertisement item. Then, the background skins of the advertisement item which is not checked are not posted.

When the user selects 'Free Choice Advertisement', a user-customized background/foreground skins providing service is performed. The user may select or permit an advertisement item among various advertisement items such as new books, famous restaurants, new clothes, and new movies. Then, the user gets into sub-categories of the selected advertisement item, and finally selects or permit background skins or an arbitrary advertisement item. Subsequently, a virtual keyboard, into which the background skins are loaded as a background image through the background/foreground skins generation process and the combined skin formation process, is displayed on the smartphone 10.

When the user selects 'Position Information Providing', a window asking the user to provide position information is activated. In this case, when the user selects 'YES', the position information of the user is transmitted to the advertisement provider server 70. The keyboard or advertisement provider server 70 provides background skins related to the position information of the user.

When the user selects or permits 'Personal Information Providing', a window asking the user to provide personal information is activated or inputted. In this case, when the user selects 'YES', the personal information of the user is transmitted to the keyboard or advertisement provider server 70. The keyboard or advertisement provider server 70 provides advertisement content skins related to the personal information of the user.

When the user selects or permits 'Activity Information Providing', a window asking the user to provide activity information is activated or provided. In this case, when the user selects 'YES', the activity information of the user is transmitted to the keyboard or advertisement provider server 70. The keyboard or advertisement provider server 70 provides advertisement content skins related to the activity information of the user.

The method for providing advertisement content skins in a user-customized manner or interactive manner may solve the problem of current banner advertisements which are provided in a one-sided manner regardless of users' intentions. Furthermore, the advertisement provider may further increase an advertisement effect by providing an advertisement necessary for users, and a user may read an advertisement selected by the user and obtain a variety of product information and so on. At this time, the technique for filtering obscene sites by searching attributes of advertisement contents may be implemented by a currently commercialized filtering technique, and the technique for recognizing a user's intention according to the morpheme processing technique may also be implemented by a well-known technique.

Meanwhile, the method in which the keyboard or advertisement provider provides background or foreground skins of an advertisement content skins to the virtual keyboard of the user may be divided into two methods. The two methods may include a real-time streaming method and an offline streaming method. In the former, background or foreground skins are downloaded from the advertisement content skins DB 36 according to the real-time streaming method. The real-time stream method has an advantage in that a user does not need to allocate a separate storage space but may cause a traffic jam when a wireless network is congested. In the latter, advertisement contents are downloaded in a memory area of a user's information communication terminal at a proper time and posted when the user requests the advertisement contents. In this method, the background skins are downloaded to the user during a time zone where the wireless network is not relatively busy, but a storage space is required to store the background skins. Therefore, when the latter method is adopted, a proper compensation needs to be added to the user.

The following is an embodiment of a compensation processor for the reward of providing character data inputted by using a keyboard selected by a user to a service server of a keyboard provider or allowing provision of an external advertisement.

Figure 9:
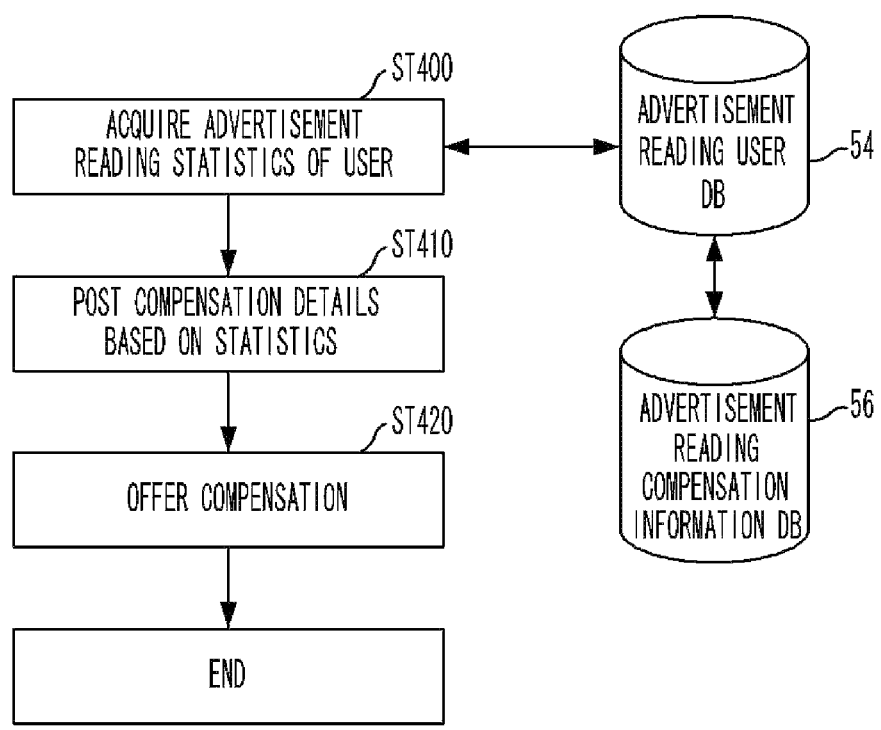
FIG. 9 is a flow chart showing a process of offering a reward in compensation.

FIG. 9 is a flow chart showing a process of offering a reward in compensation for the provided user's input character data. The user's input character providing compensation processor 52 serves to offer a reward in compensation for user's input character data. The user's input character providing compensation processor 52 searches the user's input character data provider DB 54 and acquires user's input character data, at step ST400. At this time, the user input character data provider DB 54 is a DB system which stores and manages data attributes for each user. The data attributes may include an inputted character data, a compensation detail, a compensation date and so on. Furthermore, in order to acquire information on the compensation details or the like, the user's input character providing compensation processor 52 refers to the compensation information DB 56. The compensation information DB 56 is a DB system which stores and manages data attributes for each user. The data attributes may include username, user's meaningful word data, and compensation method.

The user's input character providing compensation processor 52 displays compensation details on the smartphone of the user, based on the statistics, at step ST410. Then, the user's input character providing compensation processor 52 offers a compensation after a user's approval, at step ST420. At this time, the compensation for the user may include a discount coupon, cash, a prize, a discount, and a point. Furthermore, the user may select any one of the compensation methods.

Figure 10:
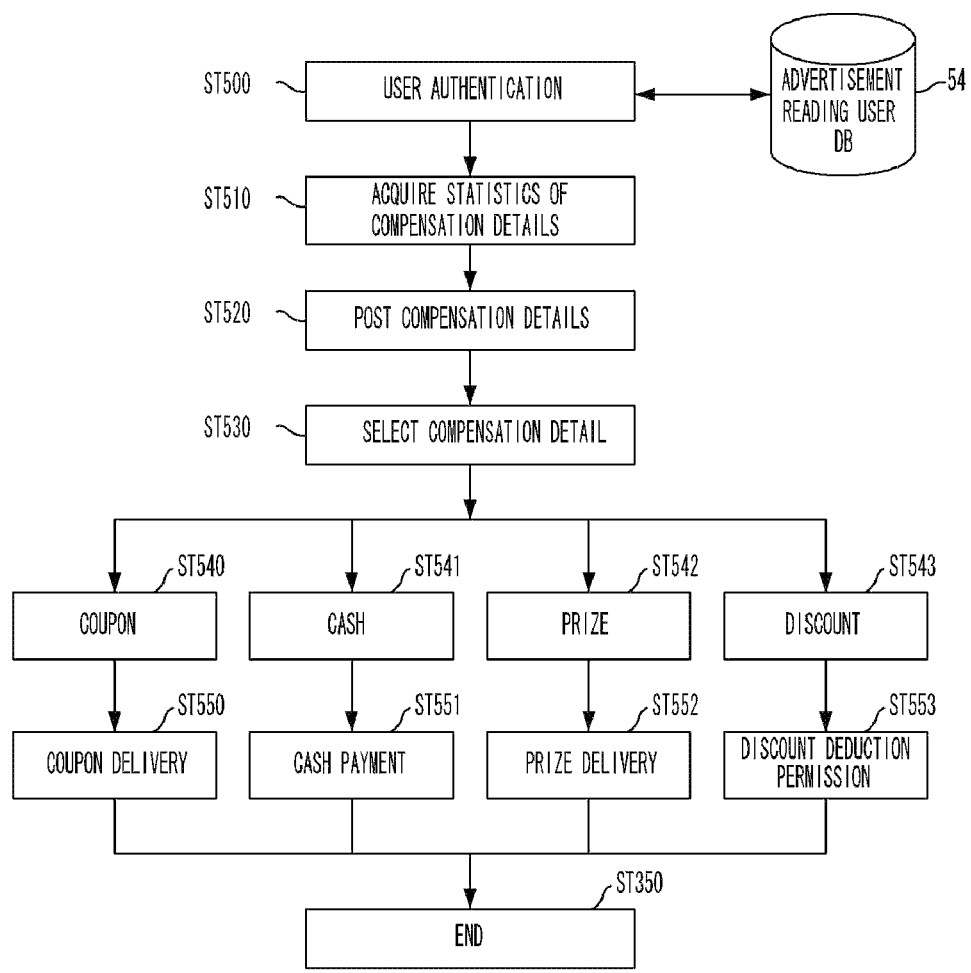
FIG. 10 is a flow chart showing a process in which a user selects a compensation method.

FIG. 10 is a flow chart showing a process in which the user selects a compensation method. Referring to FIG. 10, the process is started by a user authentication step ST500.

The authentication information of the user is stored in and managed by the user DB 54. Then, statistics of user compensation details are acquired at step ST510 and posted on the user's smartphone at step ST520. The above-described steps are performed in the same manner as described with reference to FIG. 9.

Subsequently, a process of causing the user to select a compensation method is performed at step ST530. At this time, the user may receive a coupon at step ST540, receive cash at step ST542, receive a prize at step ST543, or receive a discount at step ST544, according to the user's selection. Then, the subsequent steps are performed. For example, the subsequent steps may include coupon delivery at step ST550, cash payment at step ST551, prize delivery at step ST552, and discount deduction permission at step ST553.

As described above, the user compensation in the present invention is achieved based on a user-customized keyboard provided by the keyboard provider in the present invention. In addition, it is achieved by providing the user's personal character data or the user's personal information entered through the keyboard to the keyboard provider.

FIGS. 11A to 11D show memory tables including record attributes of the above-described DB systems. FIG. 11A shows the attributes and values of transparent skin keyboards stored in the transparent skin keyboard DB 24. Referring to FIG. 11A, the attributes include a language, an input method, a keyboard form, a creation date, a creator, a size and so on for each transparent skin keyboard. FIG. 11B shows the attributes and values of advertisement contents skins stored in the background skin DB 34. Referring to FIG. 11B, the attributes include an advertisement name, an advertisement producer, a production date, a contents media, a size, a copyright, a contents rating, a content form and so on for each background skins.

FIG. 11C shows the attributes and values of advertisement contents stored in the compensation information DB 56. Referring to FIG. 11C, the attributes include a background skins name, a compensation method, read automatic counts, a read advertisement item, a reading time, an advertisement provider and so on for each background skins. FIG. 11D shows the attributes and values of users stored in the user DB 54. Referring to FIG. 11D, the attributes include a username, a read advertisement, a reading time, a compensation amount, a compensation detail, a desired compensation method and so on for each user.

The data attributes stored in the respective DB systems as shown in FIGS. 11A to 11D are used for searching and generating a transparent skin keyboard, searching and generating an background skins, acquiring statistics for offering a compensation for advertisement reading, or offering a compensation to a user.

Figure 12A:
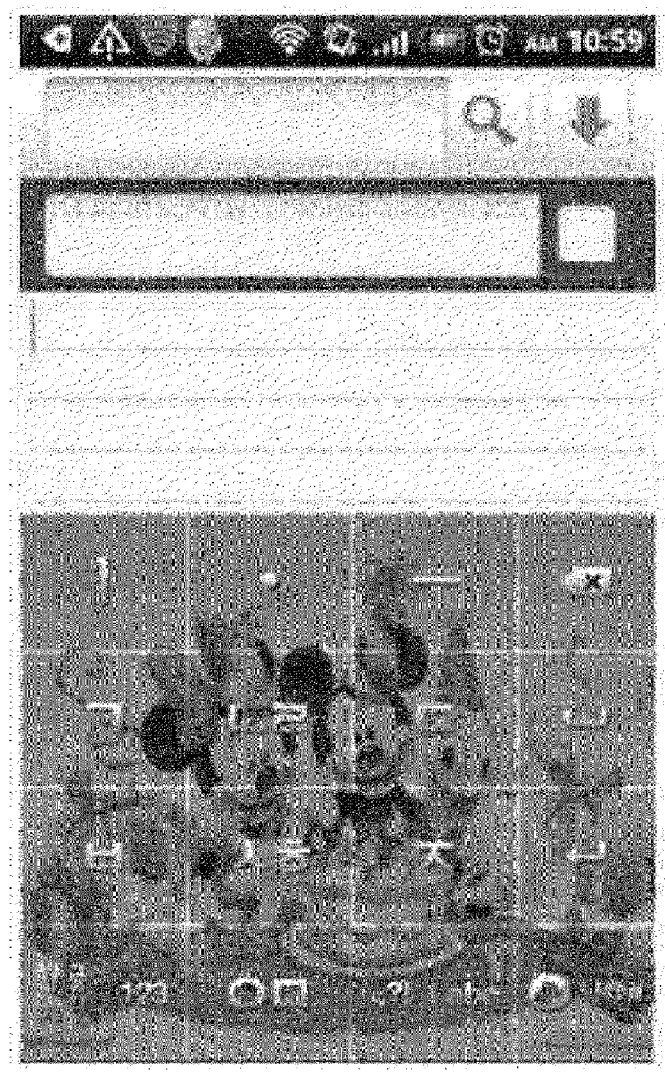
FIGS. 12A to 12D show examples in which advertisement contents skins are utilized as background images of a virtual keyboard.
Figure 12B:
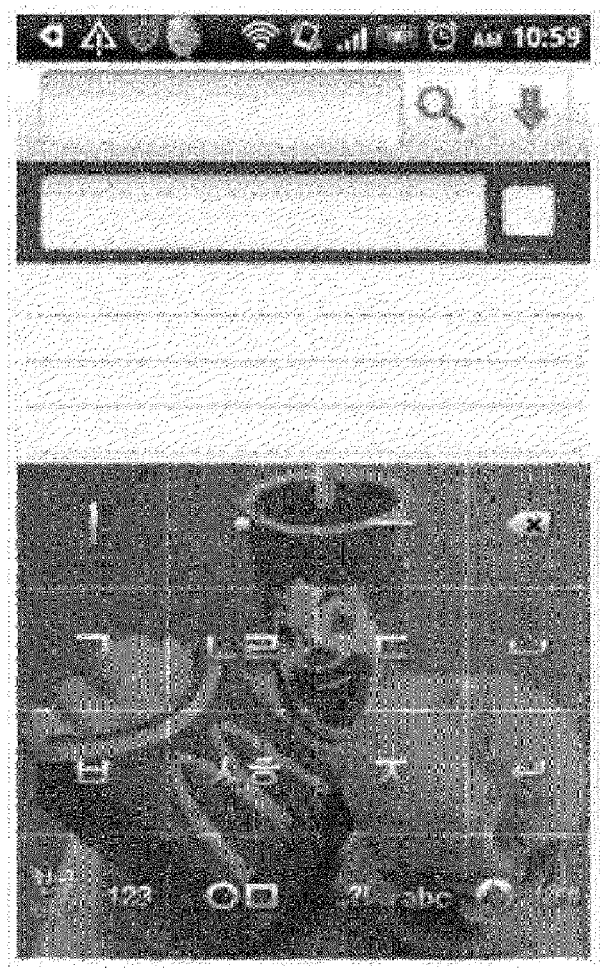
Figure 12C:
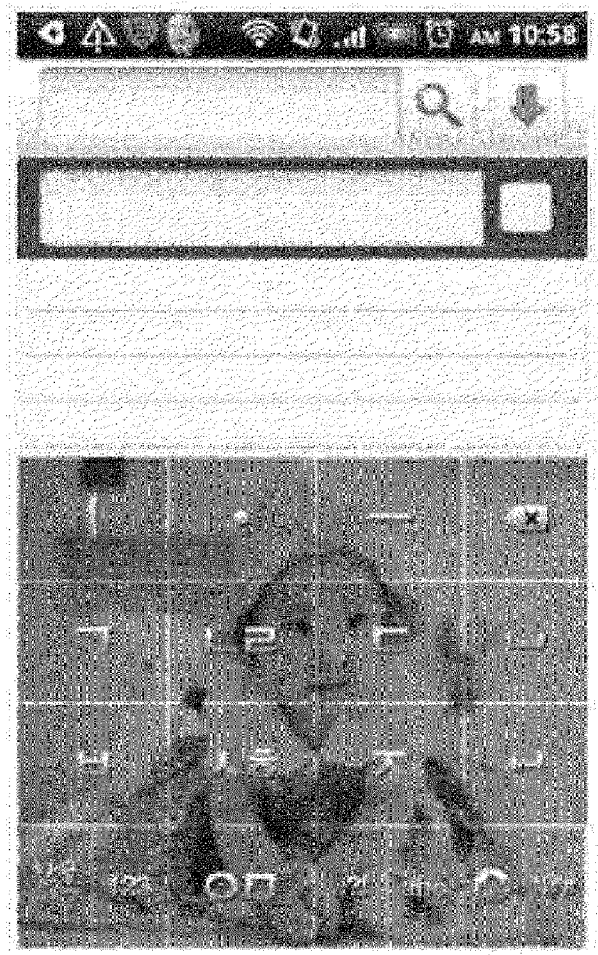
Figure 12D:
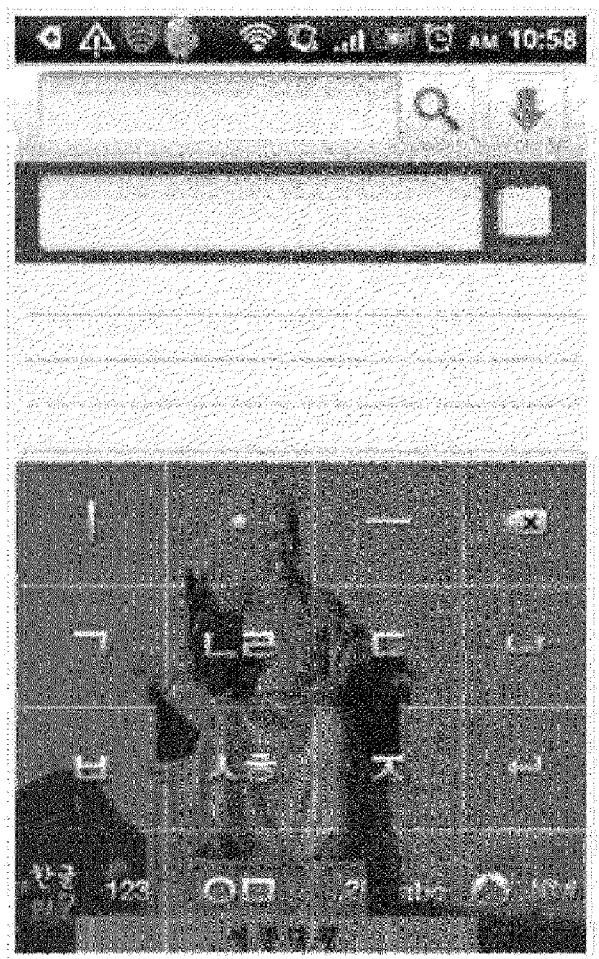

FIGS. 12A to 12D show examples in which advertisement contents skins are utilized as background images of a virtual keyboard. FIG. 12A shows an example in which background skins of a character business are provided as a background image, FIGS. 12B and 12C shows examples in which the background skins of famous brands are provided as background images, and FIG. 12D shows an example in which the background skins are implemented in a dial keypad of a smartphone. As the background space of the virtual keyboard, which is an unused space, is utilized for business purposes, the TUI based on the latest UI technology and the UX technology aimed for realizing users' latent demands may be merged, and the space utilization may be increased to create a new business model.

Meanwhile, the foreground skin generation processor 32 of FIG. 1 generates and displays the advertisement content skins on the virtual keyboard of the smartphone created by the skin combination processor 42 and the transparent skin keyboard generation processor 22.

The method of providing advertisement content skins of the present invention may be provided on the background of the transparent skin keyboard or on the image from which the transparent keyboard is removed from a combined keyboard in which the user's personal image and the transparent skin keyboard are combined. That is, user-personalized advertisement content skins are provided in the keyboard region of the smartphone.

Alternatively, the foreground skin generation processor 32 removes the generated smartphone keyboard and generates and displays the advertisement contents skins in the removed keyboard area. As described above, the foreground skin generation processor 32 of the present invention can be implemented more easily than the background skin generation processor 32.

Figure 13A:
FIGS. 13A and 13B show a real smartphone keyboard having the same objects, functions, and effects in accordance with embodiments of the present invention.
Figure 13B:
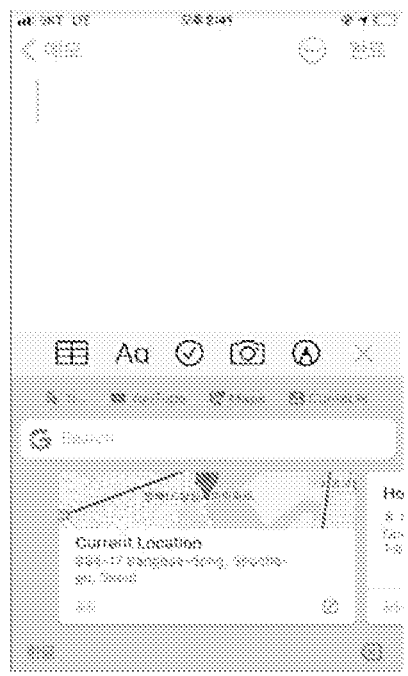

FIG. 13 is an example, in which the advertisement content skin realized in the same way as the foreground skin generation processor of the present invention is created and displayed on the keyboard area of the smartphone.

The above example shows a method of generating and displaying advertisement content skin in a keyboard area after removing a transparent skin keyboard from a virtual keyboard created on a smartphone.

FIG. 13 is a keyboard system for a smartphone having the same user-customizable, user-personalizable and user compensable keyboard functions as in the present invention.

While the present invention has been described with respect to the specific embodiments, it will be apparent to those skilled in the art that various changes and modifications may be made without departing from the spirit and scope of the invention as defined in the following claims.

The invention claimed is:

1. A system for providing a user compensable keyboard of a smartphone, the system comprising:
   the smartphone wirelessly connected to a user-customizable and user-personalizable keyboard system provider server or an advertisement provider server for mutual data communication;
   the smartphone equipped with a touch display, CPU (Central Processing Unit), a memory, and a file system or database that stores and manages user's photos or images;
   a user's photo file system configured to store and manage the user's photos or images for a background skin of a keyboard on the smartphone,
   wherein the user-customizable and user-personalizable keyboard system performs the following functions:
      selecting the keyboard from multilingual keyboards provided by the keyboard system provider server;
      selecting the background skin from the user's photo file system or an advertisement content skins database (DB);
      generating a transparent skin keyboard corresponding to the selected keyboard on the smartphone;
      combining the generated transparent skin keyboard and the selected background skin on the smartphone,
   wherein the selected background skin is loaded into a virtual keyboard region of the smartphone, and the generated transparent skin keyboard is then loaded and combined with the selected background skin to form a virtual keyboard;
      generating a user-customized and user-personalized keyboard with the background skin on the smartphone;
      storing the generated user-customized and user-personalized keyboard on the user smartphone;
   wherein the user-customizable and user-personalizable keyboard system further comprising the advertisement content skins DB configured to store and manage advertisement content skins,
      inputting character data using the generated user-customized and user-personalized keyboard by the user;
      storing the character data inputted by the user to the user's smartphone memory;
      providing the input character data to the keyboard system provider server for processing information of the provided user input character data or the user's personal information on the keyboard system provider server or on the advertisement provider server;
      searching the advertisement content skins by using the processed information from the advertisement content skins DB;
      generating the searched advertisement content skins by the keyboard system provider server or by the advertisement provider server; and
      providing the generated advertisement content skins to the user's smartphone,
   wherein the keyboard includes at least one among Galician, Gujarati, Greek, Dutch, Nepali, Norwegian, Danish, German, Lao, Latvian, Latin, Russian, Romanian, Luxembourgish, Lithuanian, Marathi, Maori, Macedonian, Malagasy, Malayalam, Malay, Maltese, Mongolian, Mongolian, Myanmar (Burmese), Basque, Vietnamese, Belarusian, Bengali, Bosnian, Bulgarian, Samoan, Serbian, Cebuano, Sesotho, Somali, Shona, Sundanese, Swahili, Swedish, Scottish Gaelic, Spanish, Slovak, Slovenian, Sindhi, Sinhalese, Arabic, Armenian, Icelandic, Haitian Creole, Irish, Azerbaijani, Afrikaans, Albanian, Amharic, Estonian, Esperanto, English, Oriya, Yoruba, Urdu, Uzbek, Ukrainian, Welsh, Uighur, Igbo, Yiddish, Italian, Indonesian, Japanese, Javanese, Georgian, Zulu, Chinese, Chewa, Czech, Kazakh, Catalan, Kannada, Corsican, Xhosa, Kurdish, Croatian, Khmer, Kinyarwanda, Kyrgyz, Tagalog, Tamil, Tajik, Tatar, Thai, Turkish, Telugu, Turkmen, Pashto, Punjabi, Persian, Portuguese, Polish, French, Frisian, Finnish, Hawaiian, Hausa, Korean, Hungarian, Hebrew, or Hindi.

2. The system according to claim 1, wherein advertisement contents include a multimedia file containing at least one of a picture, a photo, an animation, a 2D video, a 3D video, or text.

3. The system according to claim 1, wherein the information processed on the keyboard system provider server includes searching for advertisement contents, news, or map information related to character inputted by the user or information permitted by the user.

4. The system according to claim 1, wherein the advertisement content skins include at least one of a commercial solicitation designed to sell commodity, service, or similar, public notice, and a recommendation of a particular product, service, or person.

5. The system according to claim 1, wherein the advertisement content skins are displayed as a background or foreground skin of the keyboard on the smartphone.

6. A system for providing a user compensable keyboard of a smartphone, the system comprising:
   the smartphone wirelessly connected to a user-customizable and user-personalizable keyboard system provider server or an advertisement provider server for mutual data communication;

the smartphone equipped with a touch display, CPU (Central Processing Unit), a memory, and a file system or database that stores and manages user's photos or images;

a user's photo file system configured to store and manage the user's photos or images for a background skin of a keyboard on the smartphone, wherein the user-customizable and user-personalizable keyboard system performs the following functions:

selecting keyboard from multilingual keyboards provided by the keyboard system provider server;

selecting the background skin from the user's photo file system or an advertisement content skins database (DB);

generating a transparent skin keyboard corresponding to the selected keyboard on the smartphone;

combining the generated transparent skin keyboard and the selected background skin on the smartphone, wherein the selected background skin is loaded into a virtual keyboard region of the smartphone, and the generated transparent skin keyboard is then loaded and combined with the selected background skin to form a virtual keyboard;

generating a user-customized and user-personalized keyboard with the background skin on the smartphone;

storing the generated user-customized and user-personalized keyboard of the user smartphone on the user smartphone;

wherein the user-customizable and user-personalizable keyboard system further comprising the advertisement content skins DB configured to store and manage advertisement content skins, inputting character data using the generated user-customized and user-personalized keyboard by the user;

storing the character data inputted by the user to the user's smartphone memory;

providing the input character data to the keyboard system provider server for processing information of the provided user input character data or the user's personal information on the keyboard system provider server or on the advertisement provider server;

searching the advertisement content skins by using the processed information from the advertisement content skins DB;

generating the searched advertisement content skins by the keyboard system provider server or by the advertisement provider server;

displaying the generated advertisement content skins on a keyboard region of the user's smartphone; and compensating for providing the user's personal character data or user's personal information entered by the user-personalizable keyboard to the keyboard system provider server or to the advertisement provider server.

7. The system according to claim 6, the keyboard includes at least one among Galician, Gujarati, Greek, Dutch, Nepali, Norwegian, Danish, German, Lao, Latvian, Latin, Russian, Romanian, Luxembourgish, Lithuanian, Marathi, Maori, Macedonian, Malagasy, Malayalam, Malay, Maltese, Mongolian, Mongolian, Myanmar (Burmese), Basque, Vietnamese, Belarusian, Bengali, Bosnian, Bulgarian, Samoan, Serbian, Cebuano, Sesotho, Somali, Shona, Sundanese, Swahili, Swedish, Scottish Gaelic, Spanish, Slovak, Slovenian, Sindhi, Sinhalese, Arabic, Armenian, Icelandic, Haitian Creole, Irish, Azerbaijani, Afrikaans, Albanian, Amharic, Estonian, Esperanto, English, Oriya, Yoruba, Urdu, Uzbek, Ukrainian, Welsh, Uighur, Igbo, Yiddish, Italian, Indonesian, Japanese, Javanese, Georgian, Zulu, Chinese, Chewa, Czech, Kazakh, Catalan, Kannada, Corsican, Xhosa, Kurdish, Croatian, Khmer, Kinyarwanda, Kyrgyz, Tagalog, Tamil, Tajik, Tatar, Thai, Turkish, Telugu, Turkmen, Pashto, Punjabi, Persian, Portuguese, Polish, French, Frisian, Finnish, Hawaiian, Hausa, Korean, Hungarian, Hebrew, or Hindi.

8. The system according to claim 6, wherein advertisement contents include a multimedia file containing at least one of a picture, a photograph, an animation, a 2D video, a 3D video, or text.

9. The system according to claim 6, wherein a compensation for providing user's input character data to the keyboard system provider is the advertisement content skins searched by the user's input character or user's personal information.

10. The system according to claim 6, wherein the advertisement content skins include at least one of a commercial solicitation designed to sell some commodity, service, or similar, public notice, and a recommendation of a particular product, service or person.

11. A method for a system for providing a user compensable keyboard of a smartphone, wherein the system comprises the smartphone wirelessly connected to a user-customizable and user-personalizable keyboard system provider server or an advertisement provider server for mutual data communication; the smartphone equipped with a touch display, CPU (Central Processing Unit), a memory, and a file system or database that stores and manages user's photos or images; a user's photo file system configured to store and manage the user's photos or images for a background skin of a keyboard on the smartphone; and an advertisement content skins database (DB) configured to store and manage advertisement content skins, the method comprising the steps of:

selecting a user-personalizable and user-customizable keyboard from multilingual keyboards provided by the keyboard system provider server;

selecting background skin from the user's photo file system or an advertisement content skins DB;

generating a transparent skin keyboard corresponding to the selected keyboard on the smartphone;

combining the generated transparent skin keyboard and the selected background skin on the smartphone, wherein the selected background skin is loaded into a virtual keyboard region of the smartphone, and the generated transparent skin keyboard is then loaded and combined with the selected background skin to form a virtual keyboard;

generating a user-customized and user-personalized keyboard with the background skin on the smartphone;

storing the generated user-customized and user-personalized keyboard on the user smartphone;

inputting character data using the generated user-customized and user-personalized keyboard by the user;

storing the character data inputted by the user to the user's smartphone memory;

providing the input character data to the keyboard system provider server for processing information of the provided user input character data or the user's personal information on the keyboard system provider server or on the advertisement provider server;

searching the advertisement content skins by using the processed information from the advertisement content skins DB;

generating the searched advertisement content skins by the keyboard system provider server or by the advertisement provider server; and providing the generated advertisement content skins to the user's smartphone, wherein the keyboard includes at least one among Galician, Gujarati, Greek, Dutch, Nepali, Norwegian, Danish, German, Lao, Latvian, Latin, Russian, Romanian, Luxembourgish, Lithuanian, Marathi, Maori, Macedonian, Malagasy, Malayalam, Malay, Maltese, Mongolian, Mongolian, Myanmar (Burmese), Basque, Vietnamese, Belarusian, Bengali, Bosnian, Bulgarian, Samoan, Serbian, Cebuano, Sesotho, Somali, Shona, Sundanese, Swahili, Swedish, Scottish Gaelic, Spanish, Slovak, Slovenian, Sindhi, Sinhalese, Arabic, Armenian, Icelandic, Haitian Creole, Irish, Azerbaijani, Afrikaans, Albanian, Amharic, Estonian, Esperanto, English, Oriya, Yoruba, Urdu, Uzbek, Ukrainian, Welsh, Uighur, Igbo, Yiddish, Italian, Indonesian, Japanese, Javanese, Georgian, Zulu, Chinese, Chewa, Czech, Kazakh, Catalan, Kannada, Corsican, Xhosa, Kurdish, Croatian, Khmer, Kinyarwanda, Kyrgyz, Tagalog, Tamil, Tajik, Tatar, Thai, Turkish, Telugu, Turkmen, Pashto, Punjabi, Persian, Portuguese, Polish, French, Frisian, Finnish, Hawaiian, Hausa, Korean, Hungarian, Hebrew, or Hindi.

12. The method according to claim 11, wherein the information processed on the keyboard system provider server includes searching for advertisement contents, news, or map information related to text inputted by the user or information permitted by the user.

13. The method according to claim 11, wherein the advertisement content skins include at least one of a commercial solicitation designed to sell some commodity, service, or similar, public notice, and a recommendation of a particular product, service or person.

14. The method according to claim 11, wherein the advertisement content skins are displayed as a background or foreground skin of the keyboard on the smartphone.

15. A method for a system for providing a user compensable keyboard of a smartphone, wherein the system comprises the smartphone wirelessly connected to a user-personalizable and user-customizable keyboard system provider server or an advertisement provider server for mutual data communication; the smartphone equipped with a touch display, CPU (Central Processing Unit), a memory, and a file system or database that stores and manages user's photos or images; a user's photo file system configured to store and manage the user's personal photos or images for a background skin of a keyboard on the smartphone; and an advertisement content skins database (DB) and server configured to store and manage advertisement content skins, the method comprising the steps of:

selecting a user-personalizable and user-customizable keyboard from multilingual keyboards provided by the keyboard system provider server;

selecting the background skin from the user's photo file system or an advertisement content skins DB;

generating a transparent skin keyboard corresponding to the selected keyboard on the smartphone;

combining the generated transparent skin keyboard and the selected background skin on the smartphone, wherein the selected background skin is loaded into a virtual keyboard region of the smartphone, and the generated transparent skin keyboard is then loaded and combined with the selected background skin to form a virtual keyboard;

generating a user-customized and user-personalized keyboard with the background skin on the smartphone;

storing the generated user-customized and user-personalized keyboard of the user smartphone on the user smartphone;

inputting character data using the generated user-customized and user-personalized keyboard by the user;

storing the character data inputted by the user or user's personal information to the user's smartphone memory;

providing the input character data to the keyboard system provider server for processing information of the provided user input character data or the user's personal information on the keyboard system provider server or on the advertisement provider server;

searching the advertisement content skins by using the processed information from the advertisement content skins DB;

generating the searched advertisement content skins by the keyboard system provider server or by the advertisement provider server;

displaying the generated advertisement content skins on a keyboard region of the user's smartphone; and compensating for providing the user's personal character data or user's personal information entered by the user-personalizable keyboard to the keyboard system provider server or to the advertisement provider server.

16. The method according to claim 15, wherein the multilingual keyboards include Galician, Gujarati, Greek, Dutch, Nepali, Norwegian, Danish, German, Lao, Latvian, Latin, Russian, Romanian, Luxembourgish, Lithuanian, Marathi, Maori, Macedonian, Malagasy, Malayalam, Malay, Maltese, Mongolian, Mongolian, Myanmar (Burmese), Basque, Vietnamese, Belarusian, Bengali, Bosnian, Bulgarian, Samoan, Serbian, Cebuano, Sesotho, Somali, Shona, Sundanese, Swahili, Swedish, Scottish Gaelic, Spanish, Slovak, Slovenian, Sindhi, Sinhalese, Arabic, Armenian, Icelandic, Haitian Creole, Irish, Azerbaijani, Afrikaans, Albanian, Amharic, Estonian, Esperanto, English, Oriya, Yoruba, Urdu, Uzbek, Ukrainian, Welsh, Uighur, Igbo, Yiddish, Italian, Indonesian, Japanese, Javanese, Georgian, Zulu, Chinese, Chewa, Czech, Kazakh, Catalan, Kannada, Corsican, Xhosa, Kurdish, Croatian, Khmer, Kinyarwanda, Kyrgyz, Tagalog, Tamil, Tajik, Tatar, Thai, Turkish, Telugu, Turkmen, Pashto, Punjabi, Persian, Portuguese, Polish, French, Frisian, Finnish, Hawaiian, Hausa, Korean, Hungarian, Hebrew, or Hindi.

17. The method according to claim 15, wherein advertisement contents include a multimedia file containing at least one of a picture, a photograph, an animation, a 2D video, a 3D video, or text.

18. The method according to claim 15, wherein a compensation for providing user's input character data to the keyboard system provider is the advertisement content skins searched by the user's input character or user's personal information.

19. The method according to claim 15, wherein the advertisement content skins include at least one of a commercial solicitation designed to sell some commodity, service, or similar, public notice, and a recommendation of a particular product, service or person.

* * * * *